(12) United States Patent
Fachan

(10) Patent No.: US 8,140,623 B2
(45) Date of Patent: *Mar. 20, 2012

(54) NON-BLOCKING COMMIT PROTOCOL SYSTEMS AND METHODS

(75) Inventor: Neal T. Fachan, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 651 days.

This patent is subject to a terminal disclaimer.

(21) Appl. No.: 11/449,153

(22) Filed: Jun. 8, 2006

(65) Prior Publication Data

US 2007/0168351 A1 Jul. 19, 2007

Related U.S. Application Data

(63) Continuation of application No. 11/262,306, filed on Oct. 28, 2005.

(60) Provisional application No. 60/623,843, filed on Oct. 29, 2004.

(51) Int. Cl.
*G06F 15/16* (2006.01)
(52) U.S. Cl. ............... 709/205; 709/206; 709/207
(58) Field of Classification Search .......... 709/205–207; 707/10
See application file for complete search history.

(56) References Cited

U.S. PATENT DOCUMENTS

| | | | |
|---|---|---|---|
| 4,780,796 A | 10/1988 | Fukuda et al. |
| 5,163,131 A | 11/1992 | Row et al. |
| 5,181,162 A | 1/1993 | Smith et al. |
| 5,212,784 A | 5/1993 | Sparks |
| 5,230,047 A | 7/1993 | Frey et al. |
| 5,251,206 A | 10/1993 | Calvignac et al. |
| 5,258,984 A | 11/1993 | Menon et al. |
| 5,329,626 A | 7/1994 | Klein et al. |
| 5,359,594 A | 10/1994 | Gould et al. |
| 5,403,639 A | 4/1995 | Belsan et al. |
| 5,423,046 A | 6/1995 | Nunnelley et al. |

(Continued)

FOREIGN PATENT DOCUMENTS

EP 0774723 5/1997

(Continued)

OTHER PUBLICATIONS

Krishna, Reddy P et al., Reducing the blocking in two phase commit with backup sites, Apr. 15, 2003, Elsevier, pp. 39-47.*

(Continued)

*Primary Examiner* — Phuoc Nguyen
*Assistant Examiner* — Steven Nguyen
(74) *Attorney, Agent, or Firm* — Knobbe, Martens, Olson & Bear LLP

(57) ABSTRACT

Systems and methods are provided for atomic single-failure non-blocking and double-failure non-blocking commitment protocols. The protocols may be used for a variety of transactions that involve two or more parties including an initiator of the transaction, a coordinator of the transaction, and one or more participants in the transaction. The participants notify the coordinator when they are prepared to commit the transaction. The coordinator then determines when to commit or abort the transaction. If the coordinator disconnects from one or more of the participants, the participants can resolve the transaction independently. Some embodiments also include a distributor that interacts with the coordinator and the participants to resolve the transaction. If one or more parties become disconnected from the coordinator or the distributor, the participants vote to determine whether to receive instructions from the coordinator or the distributor.

14 Claims, 13 Drawing Sheets

U.S. PATENT DOCUMENTS

| | | | |
|---|---|---|---|
| 5,459,871 A | 10/1995 | Van Den Berg | |
| 5,481,699 A | 1/1996 | Saether | |
| 5,548,724 A | 8/1996 | Akizawa et al. | |
| 5,548,795 A | 8/1996 | Au | |
| 5,568,629 A | 10/1996 | Gentry et al. | |
| 5,596,709 A | 1/1997 | Bond et al. | |
| 5,606,669 A | 2/1997 | Bertin et al. | |
| 5,612,865 A | 3/1997 | Dasgupta | |
| 5,649,200 A | 7/1997 | Leblang et al. | |
| 5,657,439 A | 8/1997 | Jones et al. | |
| 5,668,943 A | 9/1997 | Attanasio et al. | |
| 5,680,621 A | 10/1997 | Korenshtein | |
| 5,694,593 A | 12/1997 | Baclawski | |
| 5,696,895 A | 12/1997 | Hemphill et al. | |
| 5,734,826 A | 3/1998 | Olnowich et al. | |
| 5,754,756 A | 5/1998 | Watanabe et al. | |
| 5,761,659 A | 6/1998 | Bertoni | |
| 5,774,643 A | 6/1998 | Lubbers et al. | |
| 5,799,305 A | 8/1998 | Bortvedt et al. | |
| 5,805,578 A | 9/1998 | Stirpe et al. | |
| 5,805,900 A | 9/1998 | Fagen et al. | |
| 5,806,065 A | 9/1998 | Lomet | |
| 5,822,790 A | 10/1998 | Mehrotra | |
| 5,862,312 A | 1/1999 | Mann | |
| 5,870,563 A | 2/1999 | Roper et al. | |
| 5,878,410 A | 3/1999 | Zbikowski et al. | |
| 5,878,414 A * | 3/1999 | Hsiao et al. | 707/8 |
| 5,884,046 A | 3/1999 | Antonov | |
| 5,884,098 A | 3/1999 | Mason, Jr. | |
| 5,884,303 A | 3/1999 | Brown | |
| 5,890,147 A | 3/1999 | Peltonen et al. | |
| 5,917,998 A | 6/1999 | Cabrera et al. | |
| 5,933,834 A | 8/1999 | Aichelen | |
| 5,943,690 A | 8/1999 | Dorricott et al. | |
| 5,963,963 A | 10/1999 | Schmuck et al. | |
| 5,966,707 A | 10/1999 | Van Huben et al. | |
| 5,983,232 A | 11/1999 | Zhang | |
| 5,996,089 A | 11/1999 | Mann | |
| 6,000,007 A | 12/1999 | Leung et al. | |
| 6,014,669 A | 1/2000 | Slaughter et al. | |
| 6,021,414 A | 2/2000 | Fuller | |
| 6,029,168 A | 2/2000 | Frey | |
| 6,038,570 A | 3/2000 | Hitz et al. | |
| 6,044,367 A | 3/2000 | Wolff | |
| 6,052,759 A | 4/2000 | Stallmo et al. | |
| 6,055,543 A | 4/2000 | Christensen et al. | |
| 6,055,564 A | 4/2000 | Phaal | |
| 6,070,172 A | 5/2000 | Lowe | |
| 6,081,833 A | 6/2000 | Okamoto et al. | |
| 6,081,883 A | 6/2000 | Popelka et al. | |
| 6,108,759 A | 8/2000 | Orcutt et al. | |
| 6,117,181 A | 9/2000 | Dearth et al. | |
| 6,122,754 A | 9/2000 | Litwin et al. | |
| 6,136,176 A | 10/2000 | Wheeler et al. | |
| 6,138,126 A | 10/2000 | Hitz et al. | |
| 6,154,854 A | 11/2000 | Stallmo | |
| 6,169,972 B1 | 1/2001 | Kono et al. | |
| 6,173,374 B1 | 1/2001 | Heil et al. | |
| 6,202,085 B1 | 3/2001 | Benson et al. | |
| 6,209,059 B1 | 3/2001 | Ofer et al. | |
| 6,219,693 B1 | 4/2001 | Napolitano et al. | |
| 6,226,377 B1 | 5/2001 | Donaghue, Jr. | |
| 6,247,108 B1 | 6/2001 | Long | |
| 6,279,007 B1 | 8/2001 | Uppala | |
| 6,321,345 B1 | 11/2001 | Mann | |
| 6,334,168 B1 | 12/2001 | Islam et al. | |
| 6,334,966 B1 | 1/2002 | Hahn et al. | |
| 6,353,823 B1 | 3/2002 | Kumar | |
| 6,384,626 B2 | 5/2002 | Tsai et al. | |
| 6,385,626 B1 | 5/2002 | Tamer et al. | |
| 6,393,483 B1 | 5/2002 | Latif et al. | |
| 6,397,311 B1 | 5/2002 | Capps | |
| 6,405,219 B2 | 6/2002 | Saether et al. | |
| 6,408,313 B1 | 6/2002 | Campbell et al. | |
| 6,415,259 B1 | 7/2002 | Wolfinger et al. | |
| 6,421,781 B1 | 7/2002 | Fox et al. | |
| 6,434,574 B1 | 8/2002 | Day et al. | |
| 6,449,730 B2 | 9/2002 | Mann | |
| 6,453,389 B1 | 9/2002 | Weinberger et al. | |
| 6,457,139 B1 | 9/2002 | D'Errico et al. | |
| 6,463,442 B1 | 10/2002 | Bent et al. | |
| 6,496,842 B1 | 12/2002 | Lyness | |
| 6,499,091 B1 | 12/2002 | Bergsten | |
| 6,502,172 B2 | 12/2002 | Chang | |
| 6,502,174 B1 | 12/2002 | Beardsley et al. | |
| 6,523,130 B1 | 2/2003 | Hickman et al. | |
| 6,526,478 B1 | 2/2003 | Kirby | |
| 6,546,443 B1 | 4/2003 | Kakivaya et al. | |
| 6,549,513 B1 | 4/2003 | Chao et al. | |
| 6,557,114 B2 | 4/2003 | Mann | |
| 6,567,894 B1 | 5/2003 | Hsu et al. | |
| 6,567,926 B2 | 5/2003 | Mann | |
| 6,571,244 B1 | 5/2003 | Larson | |
| 6,571,349 B1 | 5/2003 | Mann | |
| 6,574,745 B2 | 6/2003 | Mann | |
| 6,594,655 B2 | 7/2003 | Tal et al. | |
| 6,594,660 B1 | 7/2003 | Berkowitz et al. | |
| 6,594,744 B1 | 7/2003 | Humlicek et al. | |
| 6,598,174 B1 | 7/2003 | Parks et al. | |
| 6,618,798 B1 | 9/2003 | Burton et al. | |
| 6,631,411 B1 | 10/2003 | Welter et al. | |
| 6,658,554 B1 | 12/2003 | Moshovos et al. | |
| 6,662,184 B1 | 12/2003 | Friedberg | |
| 6,668,304 B1 | 12/2003 | Satran et al. | |
| 6,671,686 B2 | 12/2003 | Pardon et al. | |
| 6,671,704 B1 * | 12/2003 | Gondi et al. | 707/204 |
| 6,671,772 B1 | 12/2003 | Cousins | |
| 6,687,805 B1 | 2/2004 | Cochran | |
| 6,725,392 B1 | 4/2004 | Frey et al. | |
| 6,732,125 B1 | 5/2004 | Autrey et al. | |
| 6,742,020 B1 | 5/2004 | Dimitroff et al. | |
| 6,748,429 B1 | 6/2004 | Talluri et al. | |
| 6,801,949 B1 | 10/2004 | Bruck et al. | |
| 6,848,029 B2 | 1/2005 | Coldewey | |
| 6,856,591 B1 | 2/2005 | Ma et al. | |
| 6,871,295 B2 | 3/2005 | Ulrich et al. | |
| 6,895,482 B1 | 5/2005 | Blackmon et al. | |
| 6,895,534 B2 | 5/2005 | Wong et al. | |
| 6,907,011 B1 | 6/2005 | Miller et al. | |
| 6,907,520 B2 | 6/2005 | Parady | |
| 6,917,942 B1 | 7/2005 | Burns et al. | |
| 6,920,494 B2 | 7/2005 | Heitman et al. | |
| 6,922,696 B1 | 7/2005 | Lincoln et al. | |
| 6,922,708 B1 | 7/2005 | Sedlar | |
| 6,934,878 B2 | 8/2005 | Massa et al. | |
| 6,940,966 B2 | 9/2005 | Lee et al. | |
| 6,954,435 B2 | 10/2005 | Billhartz et al. | |
| 6,990,604 B2 | 1/2006 | Binger | |
| 6,990,611 B2 | 1/2006 | Busser | |
| 7,007,044 B1 | 2/2006 | Rafert et al. | |
| 7,007,097 B1 | 2/2006 | Huffman et al. | |
| 7,010,622 B1 | 3/2006 | Bauer et al. | |
| 7,017,003 B2 | 3/2006 | Murotani et al. | |
| 7,043,485 B2 | 5/2006 | Manley et al. | |
| 7,043,567 B2 | 5/2006 | Trantham | |
| 7,058,639 B1 | 6/2006 | Chatterjee et al. | |
| 7,069,320 B1 | 6/2006 | Chang et al. | |
| 7,103,597 B2 | 9/2006 | McGoveran | |
| 7,111,305 B2 | 9/2006 | Solter et al. | |
| 7,113,938 B2 | 9/2006 | Highleyman et al. | |
| 7,124,264 B2 | 10/2006 | Yamashita | |
| 7,146,524 B2 | 12/2006 | Patel et al. | |
| 7,152,182 B2 | 12/2006 | Ji et al. | |
| 7,165,192 B1 | 1/2007 | Cadieux et al. | |
| 7,177,295 B1 | 2/2007 | Sholander et al. | |
| 7,181,746 B2 | 2/2007 | Perycz et al. | |
| 7,184,421 B1 | 2/2007 | Liu et al. | |
| 7,194,487 B1 | 3/2007 | Kekre et al. | |
| 7,206,805 B1 | 4/2007 | McLaughlin, Jr. | |
| 7,225,204 B2 | 5/2007 | Manley et al. | |
| 7,228,299 B1 | 6/2007 | Harmer et al. | |
| 7,240,235 B2 | 7/2007 | Lewalski-Brechter | |
| 7,249,118 B2 | 7/2007 | Sandler et al. | |
| 7,257,257 B2 | 8/2007 | Anderson et al. | |
| 7,290,056 B1 | 10/2007 | McLaughlin, Jr. | |
| 7,313,614 B2 | 12/2007 | Considine et al. | |
| 7,318,134 B1 | 1/2008 | Oliveira et al. | |

| | | |
|---|---|---|
| 7,346,720 B2 | 3/2008 | Fachan |
| 7,370,064 B2 | 5/2008 | Yousefi'zadeh |
| 7,373,426 B2 | 5/2008 | Jinmei et al. |
| 7,386,675 B2 | 6/2008 | Fachan |
| 7,386,697 B1 | 6/2008 | Case et al. |
| 7,440,966 B2 | 10/2008 | Adkins et al. |
| 7,451,341 B2 | 11/2008 | Okaki et al. |
| 7,509,448 B2 | 3/2009 | Fachan et al. |
| 7,509,524 B2 | 3/2009 | Patel et al. |
| 7,533,298 B2 | 5/2009 | Smith et al. |
| 7,546,354 B1 | 6/2009 | Fan et al. |
| 7,546,412 B2 | 6/2009 | Ahmad et al. |
| 7,551,572 B2 | 6/2009 | Passey et al. |
| 7,558,910 B2 | 7/2009 | Alverson et al. |
| 7,571,348 B2 | 8/2009 | Deguchi et al. |
| 7,577,258 B2 | 8/2009 | Wiseman et al. |
| 7,577,667 B2 | 8/2009 | Hinshaw et al. |
| 7,590,652 B2 | 9/2009 | Passey et al. |
| 7,593,938 B2 | 9/2009 | Lemar et al. |
| 7,596,713 B2 | 9/2009 | Mani-Meitav et al. |
| 7,631,066 B1 * | 12/2009 | Schatz et al. ............. 709/224 |
| 7,639,818 B2 | 12/2009 | Fujimoto et al. |
| 7,665,123 B1 | 2/2010 | Szor et al. |
| 7,676,691 B2 | 3/2010 | Fachan et al. |
| 7,680,836 B2 | 3/2010 | Anderson et al. |
| 7,680,842 B2 | 3/2010 | Anderson et al. |
| 7,685,126 B2 | 3/2010 | Patel et al. |
| 7,685,162 B2 | 3/2010 | Heider et al. |
| 7,689,597 B1 | 3/2010 | Bingham et al. |
| 7,707,193 B2 | 4/2010 | Zayas et al. |
| 7,716,262 B2 | 5/2010 | Pallapotu |
| 7,734,603 B1 | 6/2010 | McManis |
| 7,739,288 B2 | 6/2010 | Lemar et al. |
| 7,743,033 B2 | 6/2010 | Patel et al. |
| 7,752,226 B1 | 7/2010 | Harmer et al. |
| 7,752,402 B2 | 7/2010 | Fachan et al. |
| 7,756,898 B2 | 7/2010 | Passey et al. |
| 7,779,048 B2 | 8/2010 | Fachan et al. |
| 7,783,666 B1 | 8/2010 | Zhuge et al. |
| 7,788,303 B2 | 8/2010 | Mikesell et al. |
| 7,797,283 B2 | 9/2010 | Fachan et al. |
| 7,797,323 B1 | 9/2010 | Eshghi et al. |
| 7,822,932 B2 | 10/2010 | Fachan et al. |
| 7,840,536 B1 | 11/2010 | Ahal et al. |
| 7,844,617 B2 | 11/2010 | Lemar et al. |
| 7,848,261 B2 | 12/2010 | Fachan |
| 7,870,345 B2 | 1/2011 | Daud et al. |
| 7,882,068 B2 | 2/2011 | Schack et al. |
| 7,882,071 B2 | 2/2011 | Fachan et al. |
| 7,899,800 B2 | 3/2011 | Fachan et al. |
| 7,900,015 B2 | 3/2011 | Fachan et al. |
| 7,917,474 B2 | 3/2011 | Passey et al. |
| 7,937,421 B2 | 5/2011 | Mikesell et al. |
| 7,949,636 B2 | 5/2011 | Akidau et al. |
| 7,949,692 B2 | 5/2011 | Lemar et al. |
| 7,953,704 B2 | 5/2011 | Anderson et al. |
| 7,953,709 B2 | 5/2011 | Akidau et al. |
| 7,962,779 B2 | 6/2011 | Patel et al. |
| 7,966,289 B2 | 6/2011 | Lu et al. |
| 7,971,021 B2 | 6/2011 | Daud et al. |
| 7,984,324 B2 | 7/2011 | Daud et al. |
| 2001/0042224 A1 | 11/2001 | Stanfill et al. |
| 2001/0047451 A1 | 11/2001 | Noble et al. |
| 2001/0056492 A1 | 12/2001 | Bressoud et al. |
| 2002/0010696 A1 | 1/2002 | Izumi |
| 2002/0029200 A1 | 3/2002 | Dulin et al. |
| 2002/0035668 A1 | 3/2002 | Nakano et al. |
| 2002/0038436 A1 | 3/2002 | Suzuki |
| 2002/0049778 A1 | 4/2002 | Bell et al. |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078161 A1 | 6/2002 | Cheng |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 * | 7/2002 | Collier et al. ............. 705/5 |
| 2002/0095438 A1 | 7/2002 | Rising et al. |
| 2002/0107877 A1 | 8/2002 | Whiting et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0158900 A1 | 10/2002 | Hsieh et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0170036 A1 | 11/2002 | Cobb et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0009511 A1 * | 1/2003 | Giotta et al. ............. 709/201 |
| 2003/0014391 A1 | 1/2003 | Evans et al. |
| 2003/0033308 A1 | 2/2003 | Patel et al. |
| 2003/0061491 A1 | 3/2003 | Jaskiewicz et al. |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0126522 A1 | 7/2003 | English et al. |
| 2003/0135514 A1 | 7/2003 | Patel et al. |
| 2003/0149750 A1 | 8/2003 | Franzenburg |
| 2003/0158861 A1 | 8/2003 | Sawdon et al. |
| 2003/0158873 A1 | 8/2003 | Sawdon et al. |
| 2003/0161302 A1 | 8/2003 | Zimmermann et al. |
| 2003/0163726 A1 | 8/2003 | Kidd |
| 2003/0172149 A1 | 9/2003 | Edsall et al. |
| 2003/0177308 A1 | 9/2003 | Lewalski-Brechter |
| 2003/0182312 A1 | 9/2003 | Chen et al. |
| 2003/0182325 A1 | 9/2003 | Manley et al. |
| 2003/0233385 A1 | 12/2003 | Srinivasa et al. |
| 2003/0237019 A1 | 12/2003 | Kleiman et al. |
| 2004/0003053 A1 | 1/2004 | Williams |
| 2004/0024731 A1 | 2/2004 | Cabrera et al. |
| 2004/0024963 A1 | 2/2004 | Talagala et al. |
| 2004/0078680 A1 | 4/2004 | Hu et al. |
| 2004/0078812 A1 | 4/2004 | Calvert |
| 2004/0117802 A1 | 6/2004 | Green |
| 2004/0133670 A1 | 7/2004 | Kaminsky et al. |
| 2004/0143647 A1 | 7/2004 | Cherkasova |
| 2004/0153479 A1 | 8/2004 | Mikesell et al. |
| 2004/0158549 A1 | 8/2004 | Matena et al. |
| 2004/0174798 A1 | 9/2004 | Riguidel et al. |
| 2004/0189682 A1 | 9/2004 | Troyansky et al. |
| 2004/0199734 A1 | 10/2004 | Rajamani et al. |
| 2004/0199812 A1 | 10/2004 | Earl et al. |
| 2004/0205141 A1 | 10/2004 | Goland |
| 2004/0230748 A1 | 11/2004 | Ohba |
| 2004/0240444 A1 | 12/2004 | Matthews et al. |
| 2004/0260673 A1 | 12/2004 | Hitz et al. |
| 2004/0267747 A1 | 12/2004 | Choi et al. |
| 2005/0010592 A1 | 1/2005 | Guthrie |
| 2005/0033778 A1 * | 2/2005 | Price ............................ 707/202 |
| 2005/0044197 A1 | 2/2005 | Lai |
| 2005/0066095 A1 | 3/2005 | Mullick et al. |
| 2005/0114402 A1 | 5/2005 | Guthrie |
| 2005/0114609 A1 | 5/2005 | Shorb |
| 2005/0125456 A1 | 6/2005 | Hara et al. |
| 2005/0131860 A1 | 6/2005 | Livshits |
| 2005/0131990 A1 | 6/2005 | Jewell |
| 2005/0138195 A1 | 6/2005 | Bono |
| 2005/0138252 A1 | 6/2005 | Gwilt |
| 2005/0171960 A1 | 8/2005 | Lomet |
| 2005/0171962 A1 | 8/2005 | Martin et al. |
| 2005/0187889 A1 | 8/2005 | Yasoshima |
| 2005/0188052 A1 | 8/2005 | Ewanchuk et al. |

| | | |
|---|---|---|
| 2005/0192993 A1 | 9/2005 | Messinger |
| 2005/0193389 A1 | 9/2005 | Murphy et al. |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0047713 A1 | 3/2006 | Gornshtein et al. |
| 2006/0047925 A1 | 3/2006 | Perry |
| 2006/0053263 A1 | 3/2006 | Prahlad et al. |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1 | 5/2006 | Godman et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0155831 A1 | 7/2006 | Chandrasekaran |
| 2006/0206536 A1 | 9/2006 | Sawdon et al. |
| 2006/0230411 A1 | 10/2006 | Richter et al. |
| 2006/0277432 A1 | 12/2006 | Patel |
| 2006/0288161 A1 | 12/2006 | Cavallo |
| 2006/0294589 A1 | 12/2006 | Achanta et al. |
| 2007/0038887 A1 | 2/2007 | Witte et al. |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094449 A1 | 4/2007 | Allison et al. |
| 2007/0094452 A1 | 4/2007 | Fachan |
| 2007/0124337 A1 | 5/2007 | Flam |
| 2007/0168351 A1 | 7/2007 | Fachan |
| 2007/0171919 A1 | 7/2007 | Godman et al. |
| 2007/0192254 A1 | 8/2007 | Hinkle |
| 2007/0195810 A1 | 8/2007 | Fachan |
| 2007/0233684 A1 | 10/2007 | Verma et al. |
| 2007/0233710 A1 | 10/2007 | Passey et al. |
| 2007/0244877 A1 | 10/2007 | Kempka |
| 2007/0255765 A1 | 11/2007 | Robinson |
| 2007/0288490 A1 | 12/2007 | Longshaw |
| 2008/0005145 A1 | 1/2008 | Worrall |
| 2008/0010507 A1 | 1/2008 | Vingralek |
| 2008/0021907 A1 | 1/2008 | Patel et al. |
| 2008/0031238 A1 | 2/2008 | Harmelin et al. |
| 2008/0034004 A1 | 2/2008 | Cisler et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0059734 A1 | 3/2008 | Mizuno |
| 2008/0126365 A1 | 5/2008 | Fachan et al. |
| 2008/0151724 A1 | 6/2008 | Anderson et al. |
| 2008/0154978 A1 | 6/2008 | Lemar et al. |
| 2008/0155191 A1 | 6/2008 | Anderson et al. |
| 2008/0168209 A1 | 7/2008 | Davison |
| 2008/0168304 A1 | 7/2008 | Flynn et al. |
| 2008/0168458 A1 | 7/2008 | Fachan et al. |
| 2008/0243773 A1 | 10/2008 | Patel et al. |
| 2008/0256103 A1 | 10/2008 | Fachan et al. |
| 2008/0256537 A1 | 10/2008 | Fachan et al. |
| 2008/0256545 A1 | 10/2008 | Fachan et al. |
| 2008/0263549 A1 | 10/2008 | Walker |
| 2008/0294611 A1 | 11/2008 | Anglin et al. |
| 2009/0055399 A1 | 2/2009 | Lu et al. |
| 2009/0055604 A1 | 2/2009 | Lemar et al. |
| 2009/0055607 A1 | 2/2009 | Schack et al. |
| 2009/0125563 A1 | 5/2009 | Wong et al. |
| 2009/0210880 A1 | 8/2009 | Fachan et al. |
| 2009/0248756 A1 | 10/2009 | Akidau et al. |
| 2009/0248765 A1 | 10/2009 | Akidau et al. |
| 2009/0248975 A1 | 10/2009 | Daud et al. |
| 2009/0249013 A1 | 10/2009 | Daud et al. |
| 2009/0252066 A1 | 10/2009 | Passey et al. |
| 2009/0327218 A1 | 12/2009 | Passey et al. |
| 2010/0122057 A1 | 5/2010 | Strumpen et al. |
| 2010/0161556 A1 | 6/2010 | Anderson et al. |
| 2010/0161557 A1 | 6/2010 | Anderson et al. |
| 2010/0185592 A1 | 7/2010 | Kryger |
| 2010/0223235 A1 | 9/2010 | Fachan |
| 2010/0235413 A1 | 9/2010 | Patel |
| 2010/0241632 A1 | 9/2010 | Lemar et al. |
| 2010/0306786 A1 | 12/2010 | Passey |
| 2011/0016155 A1 | 1/2011 | Fachan |
| 2011/0016353 A1 | 1/2011 | Mikesell et al. |
| 2011/0022790 A1 | 1/2011 | Fachan |
| 2011/0035412 A1 | 2/2011 | Fachan |
| 2011/0044209 A1 | 2/2011 | Fachan |
| 2011/0060779 A1 | 3/2011 | Lemar et al. |
| 2011/0087635 A1 | 4/2011 | Fachan |
| 2011/0113211 A1 | 5/2011 | Fachan et al. |
| 2011/0119234 A1 | 5/2011 | Schack et al. |
| 2011/0145195 A1 | 6/2011 | Passey et al. |
| 2011/0153569 A1 | 6/2011 | Fachan et al. |

FOREIGN PATENT DOCUMENTS

| | | |
|---|---|---|
| EP | 1421520 | 5/2004 |
| EP | 1563411 | 8/2005 |
| EP | 2284735 | 2/2011 |
| EP | 2299375 | 3/2011 |
| JP | 04096841 | 3/1992 |
| JP | 2006-506741 | 6/2004 |
| JP | 4464279 | 5/2010 |
| JP | 4504677 | 7/2010 |
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 20808/021528 | 2/2008 |
| WO | WO 2008/127947 | 10/2008 |

OTHER PUBLICATIONS

Keidar, Idit et al. "Increasing the Resilience of Distributed and Replicated Database Systems." Dec. 1998, pp. 1-25 http://people.csail.mit.edu/idish/ftp/JCSS.pdf.*

Reddy et al. "Reducing the blocking in two phase commit with backup sites." Elsevier Science 2002.*

Keidar et al. "Increasing the Resilience of Distributed and Replicated Database Systems." Institute of Computer Science, The Hebrew University of Jerusalem. Dec. 1998, pp. 1-25 http://people.csail.mit.edu/idish/ftp/JCSS.pdf.*

Nov. 15, 2002 International Search Report PCT/US02/24728.

Apr. 20, 2004 International Search Report PCT/US03/36699.

Aug. 6, 2004 International Search Report PCT/US03/33704.

European Search Report dated May 21, 2007 issued to EP application No. 02756944.1-2201.

Philip A. Bernstein, Vassos Hadzilacos, and Nathan Goodman, *Concurrency Control and Recovery in Database Systems*, Addison-Wesley, 1987.

Birk, Y., *Deterministic load-balancing schemes for disk-based video-on-demand storage servers*, Mass Storage Systems 1995; Storage—At the Forefront of Information Infrastructures', Proceedings of the Fourteenth IEEE Symposium on Monterey, CA, Sep. 11-14, 1995, pp. 17-25.

Kenneth P. Birman, *Building Secure and Reliable Network Applications*, Manning, 1996, pp. 1-327.

Kenneth P. Birman, *Building Secure and Reliable Network Applications*, Manning, 1996, pp. 328-619.

Coulouris et al., *Distributed Systems Concepts and Design*; Addison-Wesley, Second Edition, 1994, pp. 353-371 and 377-405.

Jim Gray and Andreas Reuter, *Transaction Processing: Concepts and Techniques*, Morgan Kaufmann, 1993, pp. 1-328.

Jim Gray and Andreas Reuter, *Transaction Processing: Concepts and Techniques*, Morgan Kaufmann, 1993, pp. 329-664.

Jim Gray and Andreas Reuter, *Transaction Processing: Concepts and Techniques*, Morgan Kaufmann, 1993, pp. 665-1105.
Nancy A. Lynch, *Distributed Algorithms*, Morgan Kaufmann, 1996, pp. 1-409.
Nancy A. Lynch, *Distributed Algorithms*, Morgan Kaufmann, 1996 pp. 410-871.
Sape Mullender, editor, *Distributed Systems ($2^{nd}$ Ed.)*, ACM Press/Addison-Wesley Publishing Co., New York, NY, USA, 1993, pp. 1-327.
Sape Mullender, editor, *Distributed Systems ($2^{nd}$ Ed.)*, ACM Press/Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., *Transactional Information Systems: Theory, Algorithms, and the Practice of Concurrency Control and Recovery*, Morgan Kaufmann, 2002, pp. 1-450.
Gerhard Weikum, et al., *Transactional Information Systems: Theory, Algorithms, and the Practice of Concurrency Control and Recovery*, Morgan Kaufmann, 2002, pp. 451-863.
Sanjay Ghemawat et al., *The Google File System, Symposium on Operating Systems Principles*, Oct. 19-22, 2003, 15 pages, Bolton Landing, NY.
Pei Cao et al The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Bob Duzett, et al., *An Overview of the nCube 3 Supercomputer*, IEEE, Jul. 1992, pp. 458-464.
John Henry Hartman, *The Zebra Striped Network File System*, (Sc.B. (Brown University) 1987, pp. 1-148.
Darrell D.E, Long et al., *Swift/RAID: A Distributed RAID System*, Computing Systems, vol. 7, No. 3 Summer 1994, pp. 333-359.
Michael Stonebraker et al., *Distributed Raid: A new Multiple copy Algorithm*, IEEE 1990, pp. 430-434, Berkeley, California.
Stallings, William, *Operating Systems*, Prentice Hall, Fourth Edition; 2001, pp. 197-253 and 265-293.
United States Court of Appeals, Federal Circuit, *Seachange International, Inc.* Vs. *nCUBE, Corp.*, Oct. 26, 2004, 28 pages.
United States Court of Appeals, Federal Circuit, *Seachange International, Inc.* Vs. *C-Corp, Inc.*, Jun. 29, 2005, 22 pages.
United States District Court, Delaware, *Seachange International, Inc.* Vs. *nCUBE, Corp.*, Apr. 7, 2004, 13 pages.
United States District Court, Delaware, *Seachange International, Inc.* Vs. *nCUBE, Corp.*, Aug. 29, 2000, 12 pages.
Feb. 22, 2008 Int'l Search report PCT/US07/018326, 20 pages.
May 8, 2008 Int'l Search report PCT/US07/018324, 13 pages.
Kumar Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1-p. 447, last line.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (exhibits listed separately below), 1 page.
Isilon Systems, "Isilon IQ Plateform Overview", 4 pages, 2007 (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155, 169, 171, 172, 173, 178, 181, 182, 381, 771.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of Euromicro Workshop on Multimedia and Telecommunications, vol. 2, Sep. 5, 2000, pp. 96-101.
Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.
Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.
Feb. 18, 2009 Non-Final Rejection in U.S. Appl. No. 11/262,306, filed Oct. 28, 2005.
May 15, 2009 Response to Feb. 18, 2009 Non-Final Rejection in U.S. Appl. No. 11/262,306, filed Oct. 28, 2005.
May 18, 2009 Int'l Search report PCT/US08/059798, 18 pages.
Lougher P. et al., "Scalable storage servers for digital audio and video," International Conference on Storage and Recording Systems, 1994, Keele, UK, Jan. 1, 1994, pp. 140-143.
IOS Commands, Feb. 6th, 2005, Pantz.org, [online], <web.archive.org/web/20050206184604/http://pantz.org/os/ios/ioscommands.shtml>, pp. 1-12 as printed.
IP Forwarding with Cisco Routers Lab Exercises, Jun. 15, 1999 [online], <ws.edu.isoc.org/data1999/1481713642400af6a2de65a/ip_fwd_cisco_config.ppt>, pp. 1-11 as printed.
Hisyuki Aoki, Parallel Filesystem MFS, IPSJ SIG Technical Reports, Japan, Information Processing Society of Japan, Aug. 26, 1996, vol. 96, No. 79, pp. 31 to 36 (1'. English language abstract).
Yoshitake Shinkai, Cluster File System: HAMFS, Fujitsu, Japan, Fujitsu Limited, Jul. 9, 1999, vol. 50, No. 4, pp. 210 to 214 (2'. English language abstract).
Hirofumi Yamashita, Development of Raid Filesystem FAFS/HR, IPSJ SIG Technical Reports, Japan, Information Processing Society of Japan, Sep. 16, 1994, vol. 94, No. 80, pp. 9 to 16 (3'. English language abstract).
Oct. 8, 2008 European Supplemental Search Report EP 02 75 6944, 6 pages.
Jan. 23, 2009 Examination Report EP 02 75 6944, 5 pages.
Oct. 22, 2009 Int'l Preliminary Report on Patentability PCT/US08/059798, 10 pages.
Keidar, et al.: Increasing the Resilience of Distributed and Replicated Database Systems (1998) pp. 1-25.
Sep. 19, 2009 Final Office Action in U.S. Appl. No. 11/262,306, filed Oct. 28, 2005.

Duchamp, Dan: "Analysis of Transaction Management Performance", ACM Symposium on Operating Systems Priniciples, Dec. 1989, pp. 177-190.

Silaghi, Raul et al.: "Porting OMTTs to CORBA", Lecture Notes in Computer Science, vol. 2888/2003, Nov. 2003, pp. 1521-1542.

Dorai et al.;, "Transport Threads: Resource Sharing in SMT Processor for High Single-Thread Performance", proceedings of the 2002 International Conference on Parallel Architectures and Complication Techniques, Sep. 2002, 12 pages.

Peterson, Zachary Nathaniel Joseph, "Data Placement For Copy-On-Write Using Virtual Contiguity," Master of Science in Computer Science Thesis, University of California, Santa Cruz, Sep. 2002, 67 pages.

Aug. 13, 2010 Office Action in U.S. Appl. No. 11/226,306, filed Oct. 28, 2005.

HP, Slow Internal Disk, Feb. 22, 2005, p. 2 and 6, in 7 pages.

Shen, et al., Distributed and Dynamic Task Reallocation in Robot Organizations; IEEE 2002, pp. 1019-1024.

Feb. 3, 2011 Office Action in U.S. Appl. No. 11/262,306, filed Oct. 26, 2005.

Jul. 25, 2011 Notice of Allowance in U.S. Appl. No. 11/262,306.

* cited by examiner

NON-BLOCKING COMMIT PROTOCOL SYSTEMS AND METHODS

REFERENCE TO RELATED APPLICATIONS

This application is a continuation of and claims benefit of priority under 35 U.S.C. §120 of U.S. patent application Ser. No. 11/262,306, filed Oct. 28, 2005, entitled "Non-Blocking Commit Protocol Systems and Methods," which is hereby incorporated herein by reference in its entirety and which claims priority under 35 U.S.C. §119(e) to U.S. Provisional Application No. 60/623,843, filed Oct. 29, 2004 entitled "Non-Blocking Commit Protocol Systems and Methods," which is also hereby incorporated herein by reference in its entirety.

The present application relates to U.S. application Ser. No. 11/262,314, titled "Message Batching with Checkpoints Systems and Methods", filed Oct. 28, 2005, which claims priority to U.S. Provisional Application No. 60/623,848, filed Oct. 29, 2004 entitled "Message Batching with Checkpoints Systems and Methods," and U.S. Provisional Application No. 60/628,528, filed Nov. 15, 2004 entitled "Message Batching with Checkpoints Systems and Methods;" and U.S. application Ser. No. 11/262,308, titled "Distributed System with Asynchronous Execution Systems and Methods," filed on Oct. 28, 2005, which claims priority to U.S. Provisional Application No. 60/623,846, filed Oct. 29, 2004 entitled "Distributed System with Asynchronous Execution Systems and Methods," and U.S. Provisional Application No. 60/628,527, filed Nov. 15, 2004 entitled "Distributed System with Asynchronous Execution Systems and Methods." The present application hereby incorporates by reference herein all of the foregoing applications in their entirety.

BACKGROUND

1. Field of the Invention

This invention relates to systems and methods for maintaining atomicity and reducing blocking in distributed systems.

2. Description of the Related Art

For a transaction to be atomic, a system either executes all of the operations in the transaction to completion or none of the operations. Atomicity allows multiple operations to be linked so that the final outcome of the overall transaction is known. System failures can prevent atomicity. For example, a device or communication failure in a distributed system executing a transaction can cause some of the parties participating in the transaction to execute the transaction to completion while other parties abort the transaction. This puts the parties in different states and can corrupt system information if the parties cannot roll-back to a stable condition consistent with a known state before the transaction was initiated.

In a distributed system, an atomic commit protocol (ACP) resolves transactions between a number of different parties involved in the transaction. The ACP ensures that all parties to the transaction agree on a final outcome by either committing to the transaction or aborting the transaction. Several such protocols are described below.

I. Deterministic Atomic Commit Protocol

A plurality of nodes may participate in a transaction and then send messages to each other to indicate that they are each prepared to commit the transaction. Once a particular participant receives "prepared" messages from all other participating nodes, the participant commits to the transaction and sends a "committed" message to the other participating nodes. If the participant receives an "abort" message from another participating node, the participant also aborts. Thus, the protocol in this example is deterministic in that the outcome of the transaction is causally determined when the participating nodes are prepared to commit. The transaction eventually commits when all participants successfully send "prepared" messages to the other participants. Each participating node uses this rule to decide for itself how to resolve the transaction.

However, failure of a participant can block the transaction until the participant recovers. If, for example, the participant prepares for the transaction but crashes before sending any "prepared" message, and all other participants send "prepared" messages, the transaction is blocked while the functioning participants wait to determine whether or not the failed participant prepared or aborted the transaction. Further, the functioning participants do not know whether or not the failed participant committed to the transaction after receiving their "prepared" messages. Thus, the functioning participants block the transaction until the failed participant recovers. The transaction may block for an indeterminate amount of time, which may be forever in the case of a permanent failure.

II. Two-Phase Commit Protocol

Some ACPs are non-deterministic and use a coordinator to manage the ACP and reduce blocking when a participating node fails. For example, in a conventional two-phase commit protocol the participants send "prepared" messages or "abort" messages to the coordinator rather than to each other. In a first phase, the coordinator decides whether to commit or abort the transaction. If the coordinator receives "prepared" messages from all participants, the coordinator decides to commit the transaction. If the coordinator receives an "abort" message from at least one participant, the coordinator decides to abort the transaction. In a second phase, the coordinator logs its decision and sends messages to the participating nodes to notify them of the decision. The participants can then take appropriate action.

Since the coordinator makes a unilateral decision, failure of a single participant will not block the transaction. If a participant fails or loses communication with the coordinator before sending a prepared or "abort" message, the coordinator unilaterally decides to abort after a predetermined amount of time. However, the two-phase commit protocol can still block the transaction under certain circumstances. For example, if the coordinator fails and all participants send "prepared" messages, the participants will block until the coordinator recovers and resolves the protocol.

III. Three-Phase Commit Protocol

Conventional three-phase commit protocols attempt to solve the blocking problem of the two-phase commit protocol by adding an extra phase in which a preliminary decision of whether to commit or abort the transaction is communicated to the participating nodes. If the coordinator fails, the participating nodes select one of the participants to be a new coordinator that resumes the protocol. When the failed coordinator recovers, it does so as a participant and no longer acts in the role of the coordinator. However, in many applications it is not practical to implement the conventional three-phase commit protocol. Further, the three-phase commit protocol may block if multiple participants fail or if there is a communication failure.

SUMMARY

The systems and methods described herein provide single-failure non-blocking commitment and double-failure non-blocking commitment protocols.

In one embodiment, a distributed system is provided, where the distributed system is configured to resolve a transaction among a set of parties within the distributed system. The distributed system may include a plurality of participants configured to permit communication among the plurality of participants and to resolve a transaction; a coordinator configured to communicate with the plurality of participants to resolve the transaction; wherein the plurality of participants are configured to determine whether to commit the transaction based on messages from the coordinator, and if not, to determine among the plurality of participants whether to commit the transaction.

In an additional embodiment, a method is provided for resolving a transaction among a set of nodes. The method may include determining whether communication with a coordinator node is available; if communication with the coordinator node is available, receiving messages from the coordinator node indicating whether to commit or abort a transaction; and if communication with the coordinator node is not available, receiving messages from other nodes involved in the transaction indicating whether to commit or abort the transaction.

In an additional embodiment, a distributed system is provided to resolve a transaction among a set of parties within a distributed system. The distributed system may include a set of participant nodes configured to permit communication among the plurality of nodes and to resolve a transaction among a set of parties from the plurality of nodes; an initiator located on a first node configured to communicate with the plurality of participant nodes; a coordinator located on the first node; and wherein the initiator is further configured to receive a start command to start the transaction, add participant nodes to the set of participant nodes after the start of the transaction to form an updated set of participant nodes, and send a message to the coordinator, the message configured to indicate that the initiator is prepared to commit the transaction and to indicate that the participant nodes in the updated set of participant nodes are to be included in the transaction.

In a further embodiment, a method is provided for resolving a transaction among a set of parties within a distributed system. The method may include receiving a command to start an transaction; receiving a first set of participant nodes to be included in the transaction; receiving additional participant nodes to be included in the transaction; adding the additional participant nodes to the first set of participant nodes; receiving a command to commit the transaction; and sending a message to a coordinator node to prepare for the transaction, the message including the updated first set of participant nodes.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF PREFERRED EMBODIMENTS

I. Overview

Figure 1:
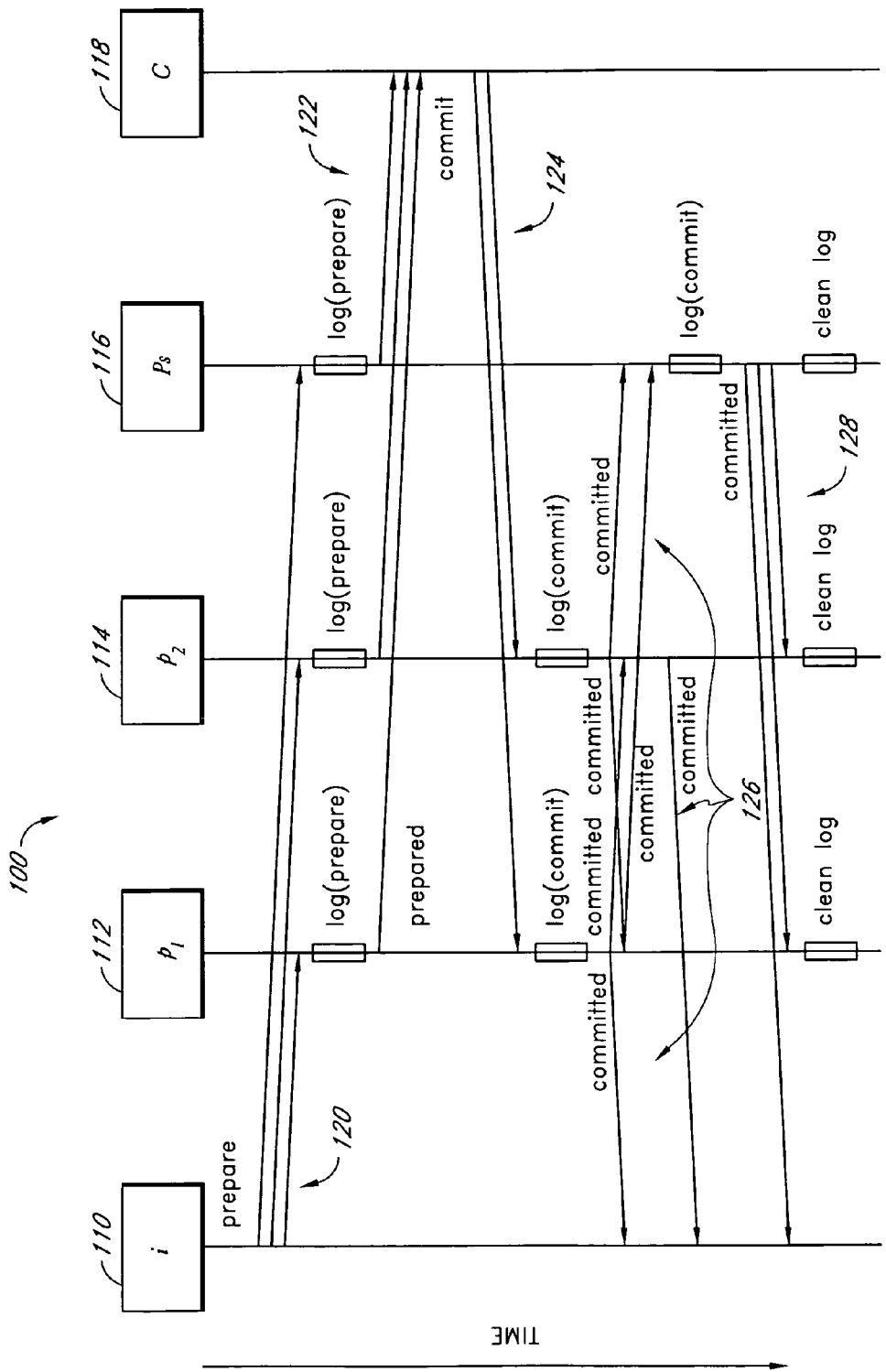
FIG. 1 illustrates an exemplary timing chart of a transaction between an initiator, two participants, a shared participant, and a coordinator using a more-modified two-phase commit protocol.

Systems and methods for providing atomic non-blocking commit protocols will now be described. These protocols may be used for a variety of transactions that involve two or more parties, where the parties include at least one initiator and one or more participants. For example, these protocols may be used in distributed file systems as described in U.S. patent application Ser. No. 10/007,003 entitled "Systems and Methods for Providing a Distributed File System Utilizing Metadata to Track Information About Data Stored Throughout the System," filed Nov. 9, 2001 which claims priority to Application No. 60/309,803 filed Aug. 3, 2001, U.S. patent application Ser. No. 10/281,467 entitled "Systems and Methods for Providing A Distributed File System Incorporating a Virtual Hot Spare," filed Oct. 25, 2002, and U.S. patent application Ser. No. 10/714,326 entitled "Systems And Methods For Restriping Files In A Distributed File System," filed Nov. 14, 2003, which claims priority to Application No. 60/426,464, filed Nov. 14, 2002, all of which are hereby incorporated by reference herein in their entirety.

A. The Initiator

The initiator has several responsibilities. In one embodiment, the initiator is responsible for starting transactions, assigning work items to participants for execution on the transactions, and deciding when to request a commit or abort for a transaction. In the examples discussed herein, the initiator sends "prepare" messages to all of the participants when the initiator wants to commit a transaction and "abort" messages when the initiator wants to abort a transaction. In addition, the initiator receives "aborted" messages and "committed" messages from the participants indicating whether the participants have completed the transaction. Typically, the initiator is allowed to abort a transaction, by sending an "abort" message to the participants, at any point up until the initiator has sent "prepare" messages to the participants. Once the initiator has sent all of the "prepare" messages, the transaction is out of the initiator's hands.

In some embodiments, the initiator controls message synchronization. For example, the initiator may mediate the distribution of the "abort" messages to guarantee that the "start" messages have been processed on all participants before they receive an "abort" or "aborted" message. As another example, the initiator may wait to collect responses to the "start" messages from one or more participants before sending the "prepare" messages.

In a distributed file system, for example, the initiator may start a transaction to write or restripe data blocks across a plurality of nodes corresponding to the participants. The initiator then sends requests to the participants to read data blocks, allocate space for data blocks, write data blocks, calculate parity data, store parity data, send messages to another participant, combinations of the forgoing, or the like.

B. The Participants

The participants' responsibilities include executing transactions, receiving messages from the initiator, and sending messages to the initiator indicating whether the transaction was completed by sending "aborted" or "committed" messages. For example, if a particular participant has an error while performing the transaction, becomes disconnected from the initiator, or receives an "abort" message from the initiator, the participant aborts the transaction and sends an "aborted" message to the initiator. If the participant commits the transaction, it sends a "committed" message to the initiator.

In one embodiment, the participants are located on separate nodes from one another. However, in some embodiments, a participant can share a node with another party. Moreover, in some embodiments, the participants have durable logs that they use to store requested transaction procedures and protocol states. As discussed in detail below, if a failure causes a particular participant to restart, the log is consulted to determine the last state of the participant. The information in the log can also be provided to other participants.

C. Communication

In one embodiment, the parties involved in the transaction are interconnected through a bi-directional communication link. The link between two or more parties may be up or down. If the link is down, the messages are dropped. If the link is up, the messages are received in the order they are sent. In one embodiment, the link comprises a "keep-alive" mechanism that quickly detects when nodes or other network components fail. The parties are notified when a link goes up or down. When a link goes down between two parties, for example, both parties are notified before it comes back up. In one embodiment, the link comprises a TCP connection. In one embodiment, the link could also include an SDP connection over Infiniband, a wireless network, a wired network, a serial connection, IP over FibreChannel, proprietary communication links, connection based datagrams or streams, and/or connection based protocols.

D. Failures

Any party, including participants and initiators, is said to fail when it stops executing. The failed party may, however, be able to reboot or otherwise restart. Once the failure is resolved by restarting, the party may resume participation in the transaction. A party can also fail wherein one or more communication links with other parties go down. This failure is over once the communication links are back up.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present disclosure. The present disclosure, however, may be practiced without the specific details or with certain alternative equivalent components and methods to those described herein. In other instances, well-known components and methods have not been described in detail so as not to unnecessarily obscure aspects of the present disclosure.

II. Modified Two-Phase Commit Protocol

Improvements to the two-phase commit protocol include converting back to the deterministic approach described above when the coordinator fails or otherwise disconnects from all of the participants. Initially, the participants send "prepared" messages to the coordinator and expect to receive a commit or "abort" message from the coordinator. As participants are disconnected from the coordinator, they send "prepared" messages to the other participants. Once a particular participant is disconnected from the coordinator, it no longer accepts commit or "abort" messages from the coordinator. When the particular participant receives "prepared" messages from all the other participants, it "commits" to the transaction and sends a "committed" message to the other participants. If a participant fails, rather than the coordinator, the coordinator aborts the transaction and notifies all other participants. The participant that failed is notified of the outcome when it recovers from the failure.

When the coordinator is not located on the same node as a participant, this improvement to the two-phase commit protocol is non-blocking (at least for single-failures). However, blocking occurs when the coordinator shares a node with a participant. For example, the shared node may fail before the other participants receive an abort or commit from the coordinator. After losing communication with the coordinator, the other participants block until the shared node recovers from the failure and the participant thereon sends a message to indicate how it resolved the transaction. In many applications, a separate node for the coordinator is not available. Therefore, undesirable blocking may occur.

III. More-Modified Two-Phase Commit Protocol

As discussed above, the modified two-phase commit protocol ("M2PC") provided a single-failure non-blocking behavior, but required the coordinator to reside on a separate node from all other parties, thereby limiting the ability to implement the modified two-phase commit protocol. Discussed below is a "more-modified" two-phase commit protocol ("MM2PC") that allows the coordinator to reside on the same node as a participant (for example, a shared participant), such that if that node fails, the non-shared participants can determine the state of the shared participant and deterministically resolve the outcome of the transaction.

The MM2PC protocol is similar to the M2PC protocol in that it utilizes a coordinator c to collect "committed" and "aborted" messages from the participants and to alert the participants as to the transaction's status. The M2PC and MM2PC protocols include, a "first prepared" state in which the participants expect the coordinator to resolve the transaction, for example state Pc as discussed below, and a "second prepared" state for situations in which the coordinator becomes disconnected from one or more of the participants, for example state Pp as discussed below. The participants collect information from the other participants in case the coordinator becomes disconnected from one or more participants. The participants transition to the second prepared state when they have lost their connection to the coordinator. Once in the second prepared state, a participant then determines its status based on status messages from other participants instead of the coordinator. In the MM2PC protocol, however, the coordinator does not send a "commit" message to the shared participant. Instead, the shared participant receives "committed" messages from the other participants. Since the remote participants notify the shared participant of the transaction's outcome, the remote participants can resolve the transaction even if they become disconnected from the coordinator.

The MM2PC protocol may also include "collection" states that allow a participant to verify that the participant has received either "aborted" messages from all of the other participants or "committed" messages from all of the other participants. This verification allows the participant to be sure that the other participants are aware of the status of the transaction before the participant clears its log of status information regarding the transaction.

A. MM2PC Exemplary Timing Chart

FIG. 1 illustrates an exemplary timing chart according to one embodiment of a commit protocol 100 for a transaction involving an initiator 110 (shown as "i"), a first participant 112 (shown as "$p_1$"), a second participant 114 (shown as "$p_2$"), a shared participant 116 (shown as "$p_s$"), and a coordinator 118 (shown as "c"). The exemplary shared participant 116 and the coordinator 118 reside on the same node.

The initiator 110 is configured to start the transaction by sending "start" messages (not shown) to the coordinator 118 and the participants $p_1$, $p_2$, $p_s$. In one embodiment, the initiator 110 collects responses to the "start" messages before requesting the participants $p_1$, $p_2$, and $p_s$ to commit the transaction. To request commitment to the transaction, the initiator 110 sends "prepare" messages 120 (three shown) to the first participant 112, the second participant 114, and the shared participant 116.

The first participant 112, the second participant 114, and the shared participant 116 each log their respective "prepare" message 120 and each determine whether they are prepared to commit the transaction. If the first participant 112 can commit the transaction, the first participant 112 sends a "prepared" message 122 to the coordinator 118. If the second participant 114 can commit the transaction, the second participant 114 sends a "prepared" message 122 to the coordinator 118. If the shared participant 116 can commit the transaction, the shared participant 116 sends a "prepared" message 122 to the coordinator 118. If the coordinator receives a "prepared" message 122 from the first participant 112, the second participant 114, and the shared participant 116, the coordinator 118 sends "commit" messages 124 (two shown) to the first participant 112 and the second participant 114. The coordinator 118 does not send a "commit" message to the shared participant 116.

After receiving the "commit" messages 124 from the coordinator 118, the first participant 112 and the second participant 114 each log the "commits" and each send "committed" messages 126 (six shown) to each other, to the shared participant 116, and to the initiator 110. For example, the first participant 112 would send a "committed" message 126 to the second participant 114, the shared participant 116, and the initiator 110. Upon receiving a "committed" message 126 from either the first participant 112 or the second participant 114, the shared participant 116 commits the transaction, logs the received "committed" message 126 and sends "committed" messages 128 (three shown) to the initiator 110, the first participant 112, and the second participant 114. The first participant 112, the second participant 114, and the shared participant 116 can then clean their respective logs and the commit protocol 100 ends.

The exemplary timing chart shown in FIG. 1 illustrates the commit protocol 100 when no failures occur. If the coordinator 118 has not disconnected from the first participant 112 or the second participant 114, the coordinator 118 determines whether to commit or abort the transaction. The coordinator 118 commits the transaction when all of the "prepared" messages 122 are received from each of the participants 112, 114, 116.

As discussed in detail below, if the node with the coordinator 118 and the shared participant 116 fails, the first participant 112 and the second participant 114 are still able to resolve the transaction. If the coordinator 118 sent the "commit" messages 124 before failing, the participants $p_1$, $p_2$ 112, 114 commit the transaction since they know that the shared participant 116 successfully prepared. However, if the coordinator 118 did not send the "commit" messages 124 before failing, the participants $p_1$, $p_2$ 112, 114 abort the transaction since they do not know whether the shared participant 116 successfully prepared. When the shared participant 116 reconnects, the participants $p_1$, $p_2$ 112, 114 inform the shared participant 116 of their decision.

So long as at least one of the first participant 112 and the second participant 114 are connected to the coordinator 118, the connected participant can still receive a "commit" or "abort" message from the coordinator 118. To avoid ending up in different states, the first participant 112 and the second participant 114 only decide whether to commit or abort if they have both been disconnected from the coordinator 118. Further, once disconnected from the coordinator 118, the first participant 112 or the second participant 114 no longer accept "commit" or "abort" messages from the coordinator 118. Since the participants 112, 114, 116 do not look to the coordinator 118 after a failure, the coordinator 118 does not log the "prepared" messages 122 received from the participants 112, 114, 116 and does not clean its log at the end of the commit protocol 100.

Figure 2:
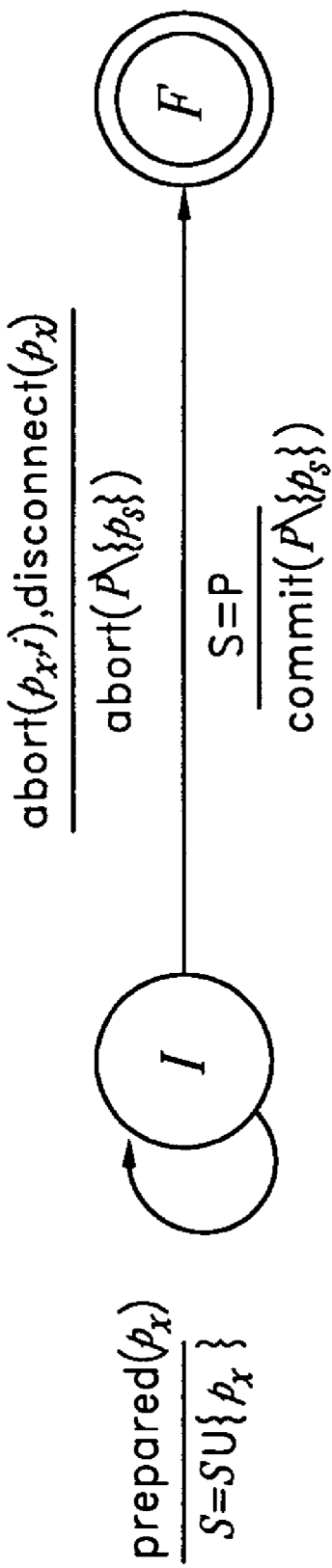
FIG. 2 illustrates an exemplary state diagram of a coordinator for the more-modified two-phase commit protocol.
Figure 3:
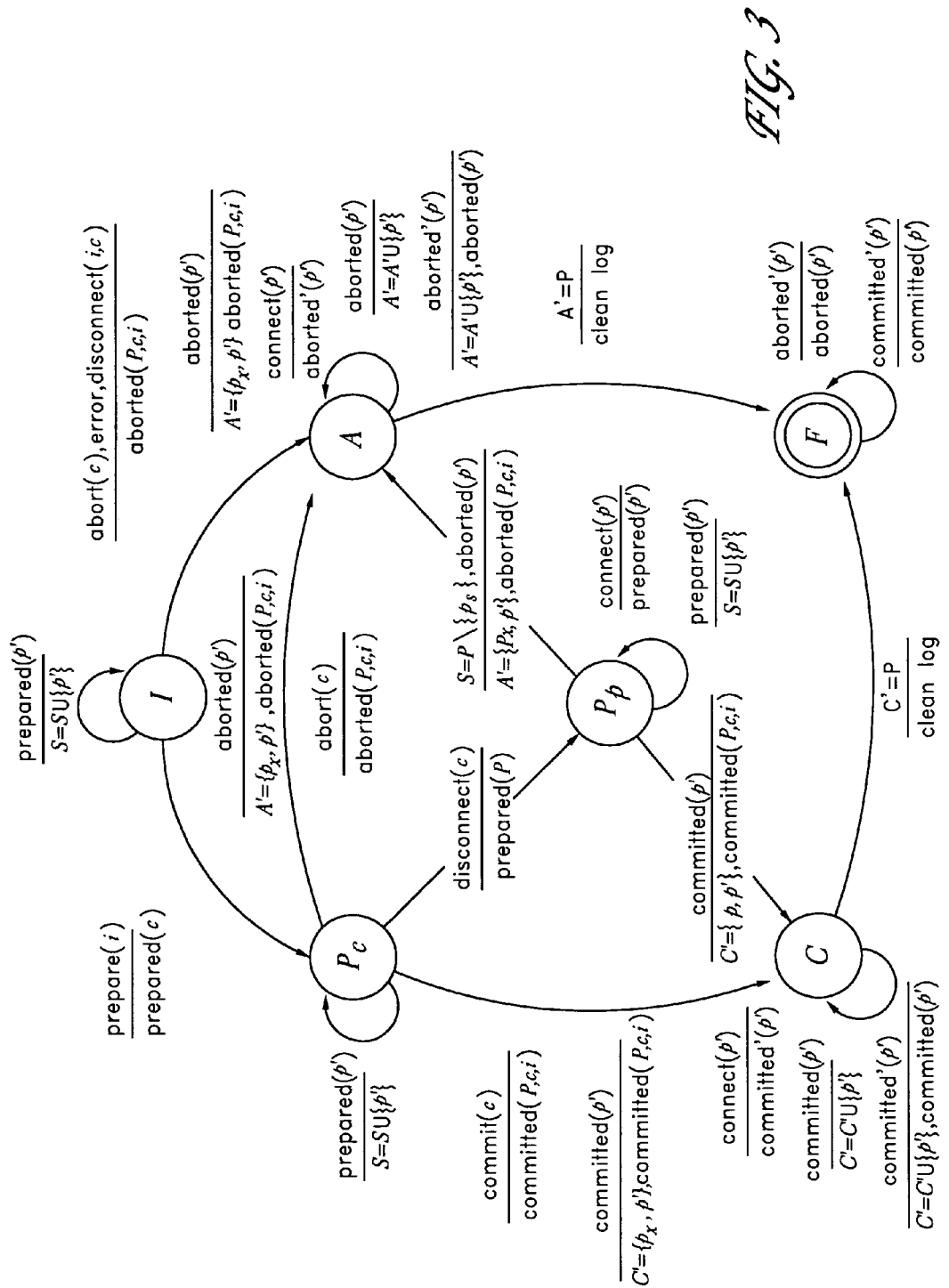
FIG. 3 illustrates an exemplary state diagram of a participant for the more-modified two-phase commit protocol.

FIGS. 2 and 3 illustrate state diagrams according to one embodiment of an MM2PC protocol. Parties in a transaction using the exemplary MM2PC protocol include a coordinator c, a shared participant $p_s$ on the same node as the coordinator c, one or more remote participants p selected from the set defined by $\{p_1, p_2, \ldots, P_n\}$, and an initiator i.

B. Coordinator States

FIG. 2 illustrates a state diagram having an initial state I and a final state F of the coordinator c during execution of the MM2PC protocol. The coordinator c can be in a state "$s_c$" defined by:

$$s_c \in \{(I, S) | S \subset P\} \cup \{F\},$$

wherein P is a set of participants defined by $P=\{p_1, p_2, \ldots, p_n, p_s\}$. In addition, the participant $p_x$ represents any one of the participants in the set $P=\{p_1, p_2, \ldots, p_n, p_s\}$. For example, in the MM2PC protocol 100 shown in FIG. 1, $P=\{p_1, p_2, p_s\}$. In one embodiment, the variable S is a proper subset of the participants P and represents the participants in P for which the coordinator c has received "prepared" messages. The coordinator c remains in the initial state I until S=P. The coordinator c then transitions to the final state F. As discussed below, the coordinator c can also transition from the initial state I to the final state F if the initiator i or a participant in P aborts the transaction or if any of the participants P disconnect before sending a "prepared" message. In this embodiment, because the shared participant $p_s$ and the coordinator c are located on the same node, then it may be assumed that the shared participant $p_s$ and the coordinator c will not become disconnected. Thus, in the exemplary embodiment, the coordinator c would not become disconnected from the shared participant $p_s$, and thus, would only transition from the initial state I to the final state F if the initiator i or a participant in P, not including the shared participant $p_s$, disconnected before sending a "prepared" message.

In the initial state I, the coordinator c receives messages from the initiator i and the participants in P. The coordinator c may receive a "prepared" message from any of the participants $p_x$ (for example, prepared $(p_x)$). If the coordinator c receives a "prepared" message from any of the participants $p_x$, the coordinator c adds the participant $p_x$ to the set of known prepared participants S (for example, $S=S\cup\{p_x\}$).

Upon receiving "prepared" messages from all of the participants in the set P (for example, S=P), the coordinator c sends a "commit" message to the participants in P except for the shared participant $p_s$ (for example, commit($P\backslash\{p_s\}$) and changes from the initial state I to the final state F. As noted above, in this embodiment, the coordinator c does not send "commit" messages to the shared participant $p_s$. If the coordinator c receives an "aborted" message from any of the participants $p_x$ or the initiator i (for example, aborted $(p_x, i)$), or if the coordinator c detects that any of the participants $p_x$ are disconnected (for example, disconnect $(p_x)$), the coordinator c sends an "abort" message to the participants in P except for the shared participant $p_s$ (for example, abort($P\backslash\{p_s\}$)). As noted above, in this embodiment, the coordinator c does not send "abort" messages to the shared participant $p_s$. The coordinator c then changes from the initial state I to the final state F and no longer participates in the transaction.

The following exemplary pseudocode further describes the coordinator's execution of the MM2PC protocol:

```
function abort(S):
    send abort to S \ {p_s}
    set state to F
function commit(S):
    send commit to S \ {p_s}
    set state to F
in state (I, S):
    on disconnect from p ∉ S:       abort(P)
    on aborted from (p_x, i):       abort(P)
    on prepared from (p_x):
        if S ∪ {p_x} ≠ P:           set state to (I, S ∪ {p_x})
        else:                       commit(P)
    on start:                       set state to (I, ∅)
```

C. Participant States

FIG. 3 illustrates a state diagram of any of the participants $p_x$ during execution of the MM2PC protocol. In the following description of FIG. 3, reference to a "participant $p_x$" refers to any of the participants $p_x$ (for example, $p_1, p_2, \ldots, p_n, p_s$) including the shared participant $p_s$. The participants $p_1$, $p_2, \ldots, p_n$ or the shared participant $p_s$ may also be referred to separately. In the MM2PC protocol, the participants in P resolve the transaction if the coordinator c fails. The participant $p_x$ is configured to communicate with the coordinator c, the initiator i and one or more other participants p' selected from P. The other participant p' may be, for example, the shared participant $p_s$ when the state diagram shown in FIG. 3 corresponds to the participant $p_n$. As another example, if there are three participants, $p_1, p_2, p_3$ and a shared participant $p_s$, if FIG. 3 corresponds to $p_1$ then p' may be $p_2, p_3$, or $p_s$; if FIG. 3 corresponds to $p_s$ then p' may be $p_1, p_2$, or $p_3$.

The state diagram illustrated in FIG. 3 includes an initial state I, a first prepared state Pc, a second prepared state Pp, an aborted state A, a committed state C, and a final state F. In the first prepared state Pc, the participant p expects to receive an "abort" or "commit" message from the coordinator c. In the second prepared state Pp, the participants in P decide amongst themselves how to resolve the transaction. The participant $p_x$ can be in a state "$s_{px}$" defined by:

$$s_{px} \in \{(r, S) | r \in \{I, Pc, Pp, A, C\}; S \subset P\} \cup \{F\}$$

wherein the variable S is a proper subset of the participants P and represents the participants in P for which the participant $p_x$ has received "prepared" messages. The participant $p_x$ remains in one of the states of which the variable r is a member until S=P. The participant $p_x$ then transitions to the final state F. As discussed below, the participant $p_x$ transitions to the final state F after performing a garbage collection procedure.

A detailed discussion of each participant state is set forth below.

1. Garbage Collection and Restart

The participant $p_x$ records messages sent or received during the MM2PC protocol in a log. The participant $p_x$ can provide the information in the log to another participant p' that may not have received one or more messages sent, for example, when the other participant p' was disconnected. The participant $p_x$ can also use the information when the participant $p_x$ restarts after a disconnect or failure to determine the outcome of the transaction.

The aborted state A and the committed state C are garbage collection states. In these states, the participant $p_x$ has already committed or aborted the transaction. However, the participant $p_x$ waits until the other participants in P complete the transaction before clearing its log. If the participant $p_x$ aborts the transaction, it includes itself in a set of known aborted participants A' (for example, A'={$p_x$}); A' represents a subset of the participants in P for which the participant $p_x$ has received "aborted" messages. If the participant $p_x$ commits, it includes itself in a set of known committed participants C' (for example, C'={$p_x$}); C' represents a subset of the participants in P for which the participant $p_x$ has received "committed" messages.

As mentioned above, the participant $p_x$ keeps a log that it can use when another participant p' reconnects or when the participant $p_x$ restarts after a disconnect or failure. On restart, the participant $p_x$ no longer accepts messages from the coordinator c. If the last entry in the log was "start," the participant $p_x$ did not receive a "prepare" message from the initiator and can abort the transaction. If the last entry in the log was "prepare," the participant $p_x$ checks to see if it has received "prepared" messages from all of the participants in P except for the shared participants $p_s$ ($S=P\backslash\{p_s\}$). If $S=P\backslash\{p_s\}$, the participant $p_x$ aborts the transaction. If $S \neq P\backslash\{p_s\}$, the participant $p_x$ enters or remains in the second prepared state Pp, which is discussed in detail below.

If the last entry in the log was "abort," the participant $p_x$ determines whether it has received "aborted" messages from all of the other participants in P (A'=P). If A'≠P, the participant $p_x$ enters the abort state A. If A'=P, the participant $p_x$ clears its log and enters the final state F. If the last entry in the log is "commit," the participant $p_x$ determines whether it has received "committed" messages from all of the other participants in P (C'=P). If C'≠P, the participant $p_x$ enters the committed state C. If C'=P, the participant $p_x$ clears its log and enters the final state F.

The following exemplary pseudocode illustrates one embodiment of garbage collection and restart for the participant $p_x$:

```
function forget( ):
    clean log
    set state to F
function abort_count(A'):
    if A' ≠ P:          set state to (A, A')
    else:               forget( )
function commit_count(C'):
    if C' ≠ P:          set state to (C, C')
    else:               forget( )
function abort(A'):
    log(abort)
    send aborted to (P ∪ {i, c}}) \ {p_x}
    abort_count(A')
function commit(C'):
    log(commit)
    send committed to (P ∪ {i}) \ {p_x}
function prepare_p_count(S):
    if S ≠ P \ {p_s}:   set state to (Pp, S)
    else:               abort({p_x})
on start:               set state to (I, ∅)
on restart:
    if last log was start:    abort({p_x})
    if last log was prepare:  prepare_p_count({p_x})
    if last log was abort:    abort_count({p_x})
    if last log was commit:   commit_count({p_x})
```

The functions abort_count( ) and commit count( ) respectively check A' and C' against the participants in P. The function forget( ) clears the log at the end of the transaction so it can be used for subsequent transactions. The abort( ) function sends an "aborted" message to the other participants in P, the initiator i, and the coordinator c. The commit( ) function sends a "committed" message to the other participants P and the initiator i. The participant $p_x$ does not send the "committed" message to the coordinator c because the coordinator c either told the participant $p_x$ to commit or the participants in P decided to commit when the coordinator c was no longer involved in the transaction. Further details about the aborted state A and the committed state C are discussed below.

2. The States a. The Initial State I

As illustrated in FIG. 3, in the initial state I, the participant $p_x$ receives a "prepare" message from the initiator i (for example, prepare(i)). If the participant $p_x$ has an error such that it cannot perform the transaction, the participant $p_x$ aborts the transaction. The participant $p_x$ may also abort the transaction if it detects a disconnect from the initiator i or the coordinator c (for example, disconnect(i, c)) or if it receives an "aborted" message from another participant p' (for example, aborted(p')). If the participant $p_x$ receives the "aborted" message from another participant p', it adds itself and the other participant p' to the set of known aborted participants A' (for example, A'={$p_x$, p'}). Further, the participant p aborts if it receives an "abort" message from the coordinator c (for example, abort(c)). It should also be noted that the shared participant $p_s$ cannot disconnect from the coordinator c since they are on the same node.

If the participant $p_x$ aborts, it sends an "aborted" message to the participants in P, the coordinator c and the initiator i (for example, aborted(P, c, i)), and enters the aborted state A. If, on the other hand, the participant $p_x$ can commit the transaction after receiving the "prepare" message from the initiator i, it sends a "prepared" message to the coordinator c (for example, prepared(c)) and enters the first prepared state Pc.

While in the initial state I, the participant $p_x$ may also receive a "prepared" message from another participant (for example, prepared(p')). As discussed below, if the participant $p_x$ later enters the second prepared state Pp, it will need to know that the other participant p' is also in the second prepared state Pp. Thus, upon receiving a "prepared" message from the other participant p', the participant $p_x$ adds the other participant p' to the subset S (for example, S=S∪{p'}).

The following exemplary pseudocode illustrates one embodiment of the participant $p_x$ in the initial state I:

```
in state (I, S):
    on disconnect from i or c:    abort({p_x})
    on abort from c:              abort({p_x})
    on aborted from p':           abort({p_x, p'})
    on prepared from p':          set state to (I, S ∪ {p'})
    on prepare from i:
        if error:                 abort({p_x})
        else:                     log(prepare)
                                  send prepared to c
                                  set state to (Pc, S)
``` b. The First Prepared State Pc

In the first prepared state Pc, the participant $p_x$ expects to receive a "commit" or "abort" message from the coordinator c. As discussed above, in some embodiments, the shared participant $p_s$ may ignore commands from the coordinator c. If the participant $p_x$ receives a "commit" message from the coordinator c (for example, commit(c)), the participant $p_x$ commits the transaction and sends a "committed" message to the other participants in P, the coordinator c, and the initiator i (for example, committed(P, c, i)). The participant $p_x$ then enters the committed state C. If the participant $p_x$ receives an "abort" message from the coordinator c (for example, abort (c)), the participant $p_x$ aborts the transaction and sends an "aborted" message to the other participants in P, the coordinator c, and the initiator i (for example, aborted(P, c, i)). The participant $p_x$ then enters the aborted state A.

While in the first prepared state Pc, the participant $p_x$ may receive a "committed" or "aborted" message from another participant p' (for example, committed(p') or aborted(p')). In response to receiving a "committed" message from another participant p', the participant $p_x$ adds itself and the other participant p' to the set of known committed participants C' (for example, C'={$p_x$, p'}), sends a "committed" message to the other participants in P, the coordinator c, and the initiator (for example, committed(P, c, i)), and transitions to the committed state C. In response to receiving an "aborted" message from another participant p', the participant $p_x$ aborts the transaction, adds itself and the other participant p' to the set of known aborted participants A' (for example, A'={$p_x$, p'}), sends an "aborted" message to the other participants in P, the coordinator c, and the initiator i (for example, aborted(P, c, i)), and enters the aborted state A.

The participant $p_x$ may also receive a "prepared" message from another participant p' while in the first prepared state Pc. Upon receiving the "prepared" message from another participant p', the participant $p_x$ adds the other participant p' to the set of known prepared participants S (for example, S=S∪{p'}). The participant $p_x$ may also detect a disconnect from the coordinator c (for example, disconnect(c)). As discussed above, the shared participant $p_s$ does not disconnect from the coordinator c since it resides on the same node. In determining that the coordinator c is disconnected, the participant $p_x$ sends a "prepared" message to the other participants in P (for example, prepared(P)) and enters the second prepared state Pp.

The following exemplary pseudocode illustrates one embodiment of the participant $p_x$ in the first prepared state Pc:

```
in state (Pc, S):
    on disconnect from c:   send prepared to P \ {p}
                            prepare_p_count(S ∪ {p})
    on abort from c:        abort({p})
    on aborted from p':     abort({p, p'})
    on commit from c:       commit({p})
    on committed from p':   commit({p, p'})
    on prepared from p':    set state to (Pc, S ∪ {p'})
```

The definitions for the functions abort, commit, and prepare_p_count are discussed above in section 1 with respect to "The Initial State I."

c. The Second Prepared State Pp

In the second prepared state Pp, the participants in P decide amongst themselves how to resolve the transaction. As discussed above, the shared participant $p_s$ does not enter the second prepared state Pp because it cannot disconnect from the coordinator c.

The participant $p_x$ cannot decide to commit once all of the participants in P (except for the shared participant $p_s$) enter the second shared state Pp because the participant $p_x$ does not know whether the shared participant $p_s$ successfully prepared. However, if the participant $p_x$ receives a "committed" message from another participant p' (for example, committed (p')), the participant $p_x$ commits since receiving the "committed" message from the other participant p' indicates that the other participant p' received a "commit" message from the coordinator c and also committed. The participant $p_x$ then adds itself and the other participant p' to the set of known committed participants C', sends a "committed" message to the other participants in P, the coordinator c, and the initiator i (for example, committed(P, c, i)), and transitions to the committed state C.

While in the second prepared state Pp, the participant $p_x$ may receive an "aborted" message from another participant p' (for example, aborted(p')). In response, the participant $p_x$ adds itself and the other participant p' to the set of known aborted participants A', sends an "aborted" message to the other participants in P, the coordinator c, and the initiator i (for example, aborted(P, c, i)), and transitions to the aborted state A.

The participant $p_x$ may also receive a "prepared" message from another participant p' message while in the second prepared state Pp. Upon receiving the "prepared" message from another participant p', the participant $p_x$ adds the other participant p' to the set of known prepared participants S (for example, S=S∪{p'}). If S=P\{$p_s$}, the participant $p_x$ aborts the transaction since all of the participants in P except for the shared participant $p_s$ have disconnected from the coordinator c but do not know whether the shared participant $p_s$ is prepared to commit the transaction.

If another participant p' connects to the participant $p_x$ (for example, connect(p')) while the participant $p_x$ is in the second prepared state Pp, the participant $p_x$ sends a "prepared" message to the other participant p' (for example, prepared(p')). This informs the other participant p' of the state of the participant $p_x$ if, for example, the other participant p' did not receive one or more messages while it was disconnected.

The following exemplary pseudocode illustrates one embodiment of the participant p in the second prepared state Pp:

```
in state (Pp, S):
    on connect to p':       send prepared to p'
    on aborted from p':     abort({p, p'})
    on committed from p':   commit({p, p'})
    on prepared from p':    prepare_p_count(S ∪ {p'})
``` d. The Committed State C

As discussed above, the committed state C is a garbage collection state wherein the participant $p_x$ handles information stored in a log during its execution of the MM2PC protocol. The participant $p_x$ waits until the other participants in P complete the transaction before clearing its log so that it can provide the information in the log to another participant p' that may not have received one or more messages sent, for example, when the other participant p' was disconnected.

In the committed state C, the participant $p_x$ may receive a "committed" message from another participant p' (for example, committed(p')). In response, the participant $p_x$ adds the other participant p' to the set of known committed participants C' (for example, C'=C'∪{p'}). Once all the participants in P have committed (for example, C'=P), the participant $p_x$ clears its log (for example, clean log) and transitions to the final state F.

When the participant $p_x$ detects the connection or reconnection with another participant p' (for example, connect(p')), the participant $p_x$ notifies the other participant p' that it is committed to ensure that the earlier "committed" message was not missed. Again, the participant $p_x$ waits in the committed state C until C'=P. However, if the participant $p_x$ did not receive a "committed" message from the other participant p' when it was disconnected, and if the other participant p' did receive the earlier "committed" message from the participant $p_x$ such that it is finished with the transaction, the participant $p_x$ does not know whether the other participant p' committed. To avoid a large number of messages being sent between the participants in P, the participants in P are not required to respond to "committed" messages. Thus, the other participant p' will not send another "committed" message to the participant $p_x$. Therefore, the participant $p_x$ will block as it remains in the completed state C.

To avoid this blocking, the participant $p_x$ sends a "committed" message to the other participant p' (for example, committed'(p')) in response to connect'(p'). The committed' message indicates to the receiver of the message that the sender does not know if the receiver has resolved the transaction. If the other participant p' is in the committed state C or the final state F, it will return the committed'(p') message to the participant $p_x$. Thus, in the committed state C, the participant $p_x$ can add the other participant p' to the variable C'. Likewise, if the participant $p_x$ receives the committed'(p') message from another participant p' while in the committed state C or the final state F, the participant $p_x$ will respond by sending the committed(p') message to the other participant p'. In the committed state C, the participant $p_x$ also adds the other participant p' to the variable C'.

The following exemplary pseudocode illustrates one embodiment of the participant $p_x$ in the committed state C:

```
in state (C, C'):
    on connect to p':        send committed' to p'
    on committed from p':    commit_count(C' ∪ {p'})
    on committed' from p':   send committed to p'
                             commit_count(C' ∪ {p'})
``` e. The Aborted State A

As discussed above, the aborted state A is also a garbage collection state wherein the participant $p_x$ handles information stored in a log during its execution of the MM2PC protocol. In the aborted state A, the participant $p_x$ may receive an "aborted" message from another participant p' (for example, aborted(p')). In response, the participant $p_x$ adds the other participant p' to the set of know aborted participants A' (for example, A'=A'∪{p'}). Once all the participants in P have aborted (for example, A'=P), the participant $p_x$ clears its log (for example, clean log) and transitions to the final state F.

When the participant $p_x$ detects the connection or reconnection with another participant p' (for example, connect(p')), the participant $p_x$ notifies the other participant p' that it has aborted to ensure that the earlier "aborted" message was not missed. Again, the participant $p_x$ waits in the aborted state A until A'=P. To avoid the blocking problem discussed above in relation to the committed state C, the participant $p_x$ sends an "aborted" message to the other participant p' (for example, aborted(p')) in response to connect(p'). The aborted' message indicates to the receiver of the message that the sender does not know if the receiver has resolved the transaction. If the other participant p' is in the aborted state A or the final state F, it will return the aborted'(p') message to the participant $p_x$. Thus, in the aborted state A, the participant $p_x$ can add the other participant p' to the variable A'. Likewise, if the participant $p_x$ receives the aborted'(p') message from another participant p' while in the aborted state A or the final state F, the participant $p_x$ will respond by sending the aborted(p') message to the other participant p'. In the aborted state A, the participant $p_x$ also adds the other participant p' to the variable A'.

The following exemplary pseudocode illustrates one embodiment of the participant $p_x$ in the aborted state A:

| in state (A, A'): | |
|---|---|
| on connect to p': | send aborted' to p' |
| on aborted from p': | abort_count(A' ∪ {p'}) |
| on aborted' from p': | send aborted to p' |
| | abort_count(A' ∪ {p'}) |

III. Two-Phase Commit Version 2 Protocol

While the MM2PC protocol allows for the coordinator to reside on the same node as a participant, the MM2PC does not address set-up phase transactions and may involve a large number of clean up messages. The two-phase commit version 2 protocol ("2PCV2") addresses set-up phase transactions, allows for the addition of late participation additions, and reduces clean up messages. The 2PCV2 protocol includes an initiator i, a coordinator c, as well as a set of participants {$p_1$, $p_2$, . . . $p_n$}. The initiator i and the coordinator c reside on the same node such that they never get disconnected from each other. In addition, one of the participants may also reside on the same node as the initiator and the coordinator. The participant, if any, that resides on the same node as the initiator and the coordinator is referred to herein as the shared participant $p_s$. The remote participants notify the shared participant of the transaction's outcome thereby allowing the remote participants to resolve the transaction if they become disconnected from the coordinator. In addition, the initiator receives "committed" messages from the participants rather than from the coordinator.

A. 2PCV2 Exemplary Timing Chart

Figure 4:
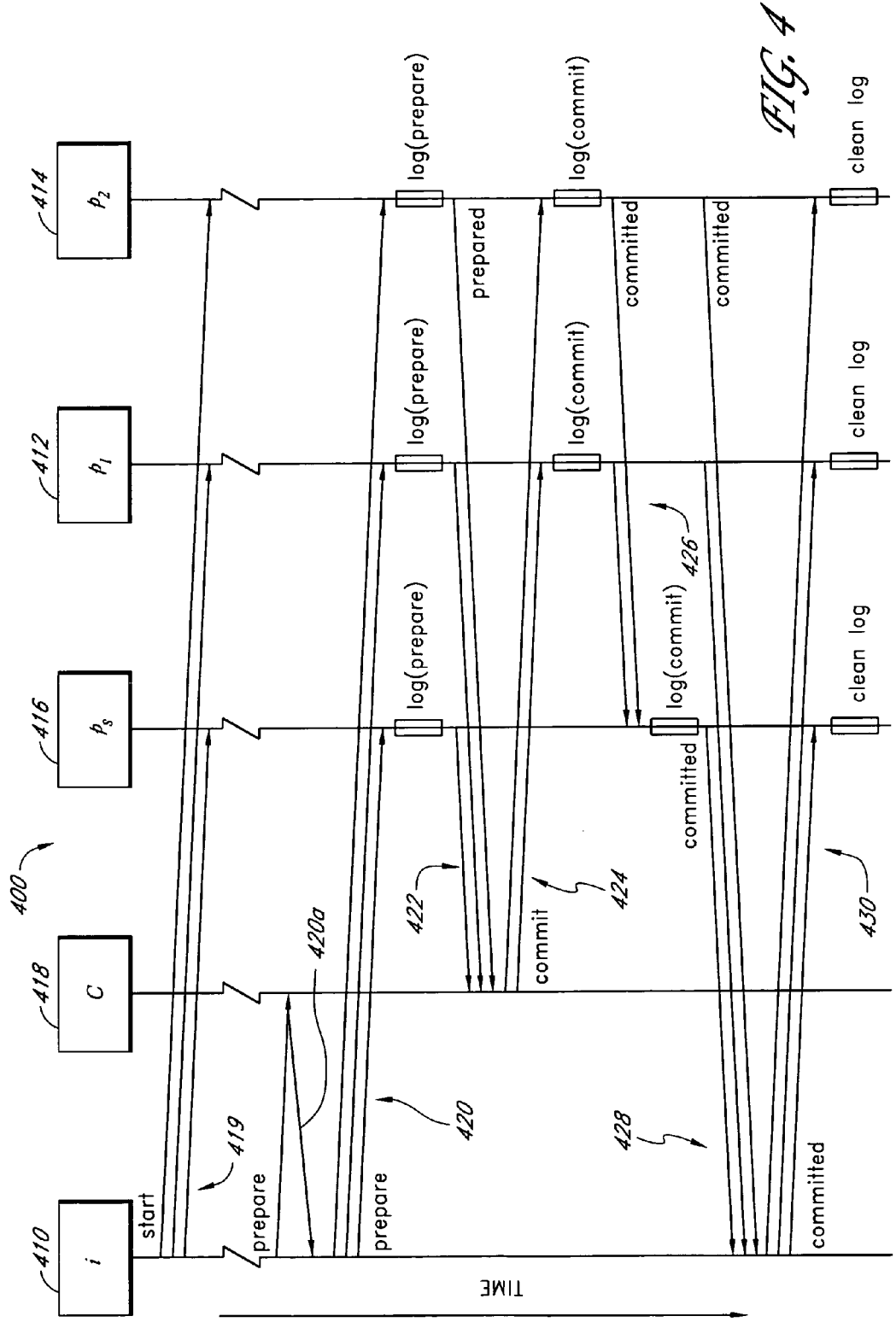
FIG. 4 illustrates an exemplary timing chart of a transaction between an initiator, two participants, a shared participant, and a coordinator using a two-phase commit version 2 protocol.

FIG. 4 illustrates an exemplary timing chart according to one embodiment of a 2PCV2 commit protocol 400 for a transaction involving an initiator 410 (shown as "i"), a first participant 412 (shown as "$p_1$"), a second participant 414 (shown as "$p_2$"), a shared participant 416 (shown as "$p_s$") and a coordinator 418 (shown as "c"). As discussed above, the initiator 410 and the coordinator 418 are on the same node. In the example shown in FIG. 4, the shared participant 416 is also on the same node as the initiator 410 and the coordinator 418. The first participant 412 and the second participant 414 are located on remote nodes.

During the transaction, the initiator 410 adds the first participant 412, the second participant 414, and the shared participant 416 to the transaction. As it does so, the initiator 410 sends start messages 419 (three shown) to the first participant 412, the second participant 414, and the shared participant 416. When the initiator 410 is ready to try to commit the transaction, the initiator sends "prepare" messages 420 (four shown) to the coordinator 418, the first participant 412, the second participant 414, and the shared participant 416. In one embodiment, the coordinator 418 is configured to return a response 420a to the "prepare" message 420. Since the initiator 410 and the coordinator 418 are on the same node, the coordinator 418 receives the "prepare" message 420 before the remote participants 412, 414.

The first participant 412, the second participant 414, and the shared participant 416 respectively log the "prepare" messages 420 and determine whether they are prepared to commit the transaction. If they can commit the transaction, the first participant 412, the second participant 414, and the shared participant 416 each send a "prepared" message 422 (three shown) to the coordinator 418. If the coordinator 418 receives all of the "prepared" messages 422, the coordinator 418 sends "commit" messages 424 (two shown) to the first participant 412 the second participant 414. The coordinator 418 does not send a "commit" message 424 to the shared participant 416.

After receiving the "commit" messages 424 from the coordinator 418, the first participant 412 and the second participant 414 each log their respective "commits" and send "committed" messages 426 to the shared participant 416. Thus, the shared participant 416 learns of the transaction's outcome from the other participants 412, 414. After committing to the transaction, the first participant 412, the second participant 414 and the shared participant 418 send "committed" messages 428 (three shown) to the initiator 410. For garbage collection purposes, the initiator 410 responds by sending "committed" messages 430 to the first participant 412, the second participant 414, and the shared participant 416. After receiving the "committed" message 430 from the initiator 410, the first participant 412, the second participant 414, and the shared participant 416 clear their respective logs and the commit protocol 400 ends.

The exemplary timing chart shown in FIG. 4 illustrates the commit protocol 400 when no failures occur. Since the remote participants 412, 414 notify the shared participant 416 of the transaction's outcome, the remote participants 412, 414 can resolve the transaction if they both become disconnected from the coordinator 418.

FIGS. 5-8 illustrate state diagrams according to one embodiment of a 2PCV2 protocol. As stated above, parties in a transaction using the 2PCV2 protocol include an initiator i, a coordinator c on the same node as the initiator i, and one or more remote participant p selected from the set defined by {$p_1$, $p_2$, . . . , $p_n$}. The parties may also include a shared participant $p_s$ on the same node as the initiator i and the coordinator c.

B. Initiator States

Figure 5:
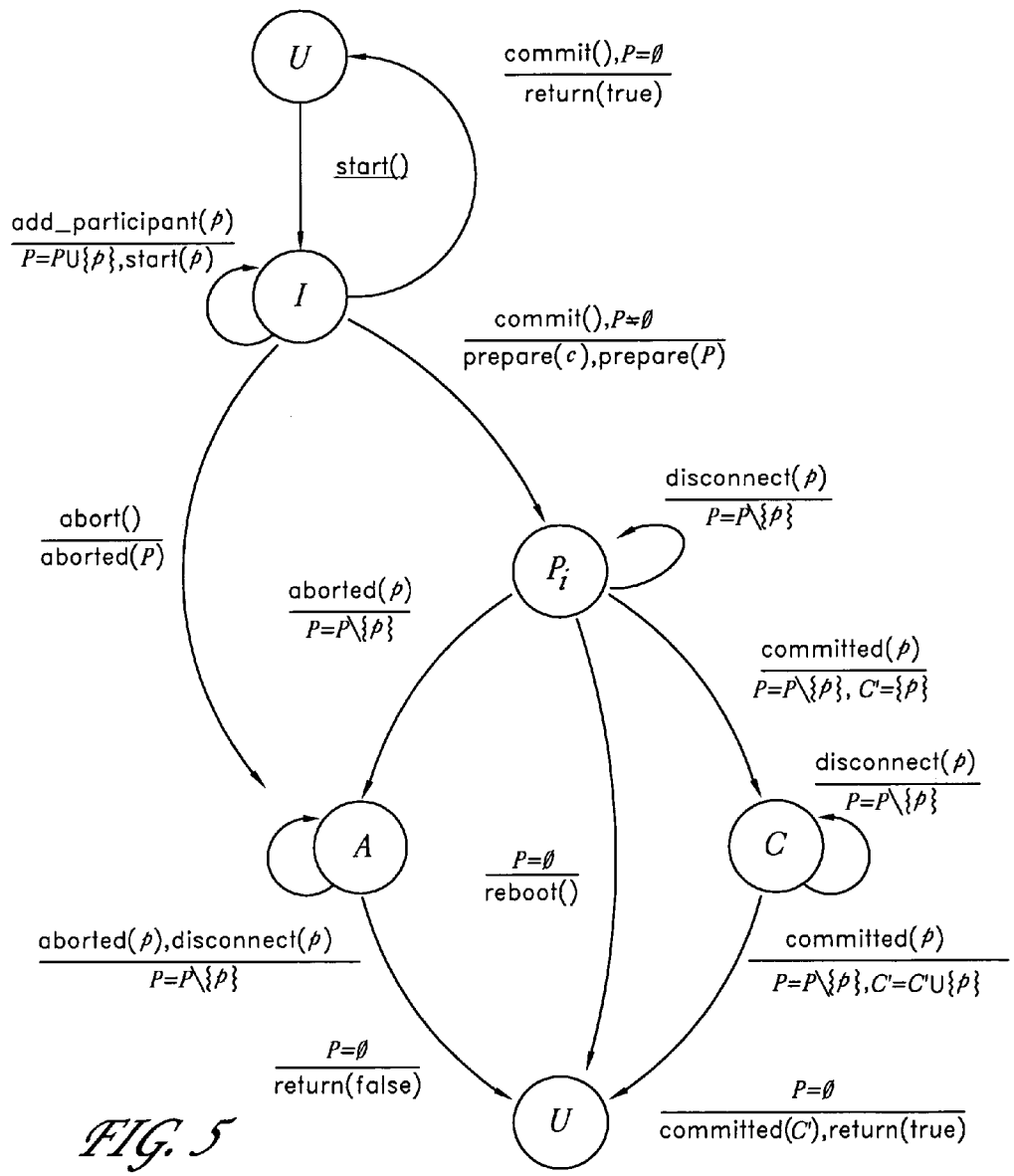
FIG. 5 illustrates an exemplary state diagram of an initiator for the two-phase commit version 2 protocol.

FIG. 5 illustrates a state diagram for the initiator i having an unknown state U, an initial state I, a prepare state $P_i$, an aborted state A, and a committed state C.

1. Unknown State U

The initiator i begins and ends the transaction in the unknown state U. Upon receiving a start command (for example, start( )) from a user, the initiator transitions to the initial state I.

2. Initial State I

While the initiator i is in the initial state I, the transaction is being performed. In one embodiment, the initiator i is configured to manage the transaction among nodes by sending transaction commands to and receiving responses from the nodes involved in the transaction. For example, in a transaction to stripe a file across a plurality of nodes in a distributed file system, the distributed system determines the nodes in which it will save data blocks. For each node selected to participate in the transaction, the distributed system sends a message to the initiator i to include the node as a participant p in the transaction (for example, add_participant(p)). In response to the add_participant(p) message, the initiator i adds the participant p to the set of participants P (for example, $P=P\cup\{p\}$) and sends a start command to the participant p (for example, start(p)).

While the initiator i is in the initial state I, the user may send an "abort" command (for example, abort( )) or a "commit" command (for example, commit( )) to the initiator i. If the initiator i receives an "abort" command from the user, the initiator i sends an "aborted" message to the participants in P (for example, aborted(P)) and transitions to the aborted state A. If the initiator i receives a "commit" command (for example, commit( )) before the user adds any participants to the transaction (for example, $P=\emptyset$), the initiator i returns true to the user (for example, return(true)) and transitions back to the unknown state U.

If the user has added participants to the transaction (for example, $P\neq\emptyset$), the initiator i sends a "prepare" message to the coordinator c (for example, prepare(c)) and a "prepare" message to the participants in P (for example, prepare(P)), and transitions to the prepare state $P_i$. The prepare(c) and prepare(P) messages include a final set of participants in the set of participants P. In some embodiments, the prepare(c) message is configured to be received by the coordinator c before the prepare(P) messages are sent. Thus, in one embodiment the prepare(c) message can be implemented as a function call rather than a message.

3. Prepare State $P_i$

In the prepare state $P_i$, the initiator i waits to receive an "aborted" or "committed" message from any one of the participants in P (for example, aborted(p) or committed(p), respectively). If the initiator i receives an "aborted" message from the participant p, the initiator i removes the participant p from the set of known participants P (for example, $P=P\backslash\{p\}$) and transitions to the aborted state A. If the initiator i receives a "committed" message from a participant p, the initiator i removes the participant p from the set of known participants P ($P=P\backslash\{p\}$), adds the participant p to the set of committed participants C' (for example, $C'=\{p\}$), and transitions to the committed state C. As discussed below, the initiator i tracks which participants in P have committed or aborted by removing the participant p from the set of known participants P when an "aborted" or "committed" message is received.

If the initiator i becomes disconnected from the participant p (for example, disconnect(p)), the initiator i removes the participant p from the set of known participants P (for example, $P=P\backslash\{p\}$). As discussed below, the disconnected participant p will resolve the transaction without receiving further information from the initiator i. Thus, the initiator i can ignore the disconnected participant p. However, if the initiator i becomes disconnected from all of the participants (for example, $P=\emptyset$), the initiator i transitions to the unknown state U and reboots.

4. The Aborted State A and the Committed State C

In the aborted state A, the initiator i removes participants from the set of participants P when it receives "aborted" messages from the participants or detects that the participants have become disconnected. When $P=\emptyset$, the initiator i returns false to the user (for example, return(false)) and transitions to the unknown state U.

In the committed state C, the initiator i removes participants from the set of participants P when it receives "committed" messages from the participants or detects that the participants have become disconnected. When the initiator i receives a "committed" message from a participant p, it also adds the corresponding participant p to the set of known committed participants C' (for example, $C'=C\cup\{p\}$). When $P=\emptyset$, the initiator i sends "committed" messages to the participants in the set of known committed participants C' (for example, committed(C')), returns true to the user (for example, return(true)), and transitions back to the unknown state U. As discussed below, the "committed" message from the initiator i is used for garbage collection.

The following exemplary pseudocode illustrates one embodiment of the initiator i:

```
in state U:
    on start( ):              set state to (I, Ø)
in state (I, P):
    on add_participant(p):    set state to (I, P ∪ {p})
                              send start to p
    on abort( ):              send aborted to P
                              set state to (A, P)
    on commit( ):
        if P = Ø:             set state to U
                              return(true)
        else:                 send prepare(P) to c
                              send prepare(P) to P
                              set state to (P_i, P)
in state (P_i, P):
    if P = Ø:                 set state to U
                              reboot( )
    on disconnect from p ∈ P: set state to (P_i, P \ {p})
    on aborted from p ∈ P:    set state to (A, P \ {p})
    on committed from p ∈ P:  set state to (C, P \ {p}, {p})
in state (A, P):
    if P = Ø:                 set state to U
                              return(false)
    on disconnect from p ∈ P: set state to (A, P \ {p})
    on aborted from p ∈ P:    set state to (A, P \ {p})
in state (C, P, C'):
    if P = Ø:                 set state to U
                              send committed(C') to C'
                              return(true)
    on disconnect from p ∈ P: set state to (C, P \ {p}, C')
    on committed from p ∈ P:  set state to (C, P \ {p}, C' ∪ {p})
```

C. Coordinator States

Figure 6:
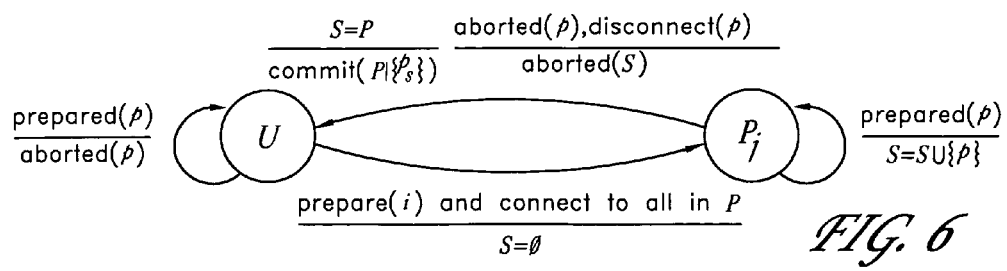
FIG. 6 illustrates an exemplary state diagram of a coordinator for the two-phase commit version 2 protocol.

FIG. 6 is a state diagram illustrating an unknown state U and a prepare state $P_j$ of the coordinator c. The coordinator c begins and ends the transaction in the unknown state U. In the unknown state U, the coordinator c waits to receive a "prepare" message from the initiator i (for example, prepare(i)). The "prepare" message informs the coordinator c that the initiator i has started the transaction. If the coordinator c is connected to all of the participants in P when it receives the prepare(i) message, the coordinator c resets the set of known prepared participants S (for example, S=Ø) and transitions to the prepare state $P_j$.

If, on the other hand, the coordinator c is disconnected from one or more of the participants when it receives the prepare(i) message, the coordinator c remains in the unknown state U. Thus, the coordinator c quickly aborts the transaction by not transitioning to the prepare state $P_j$ when at least one of the participants p is disconnected. When the other participants in P send "prepared" messages to the coordinator c (for example, prepared(p)), the coordinator c responds with an "aborted" message (for example, aborted(p)).

In the prepare state $P_j$, the coordinator c tracks the participants that are prepared to commit the transaction. When the coordinator c receives a "prepared" message from a participant p (for example, prepared(p)), the coordinator c adds the participant p to the set of known prepared participants S (for example, S=S∪{p}). Once all of the participants in P have prepared (for example, S=P), the coordinator sends a "commit" message to the participants in P except for the shared participant $p_s$ (for example, commit(P\{$p_s$})) and transitions back to the unknown state U. As discussed below, the shared participant $p_s$ receives the outcome of the transaction from the other participants. As also discussed below, the participants that receive the commit(P\{$p_s$}) message may end up ignoring it and aborting the transaction instead. Thus, the initiator i receives "committed" messages from the participants in P rather than from the coordinator c.

While in the prepare state $P_j$, the coordinator c may detect a disconnect from one of the participants in P (for example, disconnect(p)) or the coordinator c may receive an "aborted" message from one of the participants in P (for example, aborted(p)). In response, the coordinator c sends an "aborted" message to the prepared participants in S (for example, aborted(S)) and transitions back to the unknown state U.

The following exemplary pseudocode illustrates one embodiment of the coordinator c:

```
in state U:
    on prepared from p:           send aborted to p
    on prepare(P) from i:
        if connected to all in P: set state to (P, Ø, P)
        else:                     leave state as U
in state (P_j, S, P):
    if S = P:                     send commit to P \ {p_s}
                                  set state to U
    on disconnect or aborted from p ∈ P: send aborted to S
                                  set state to U
    on prepared from p ∈ P:       set state to (P_j, S ∪ {p}, P)
```

D. Remote Participant States

Figure 7:
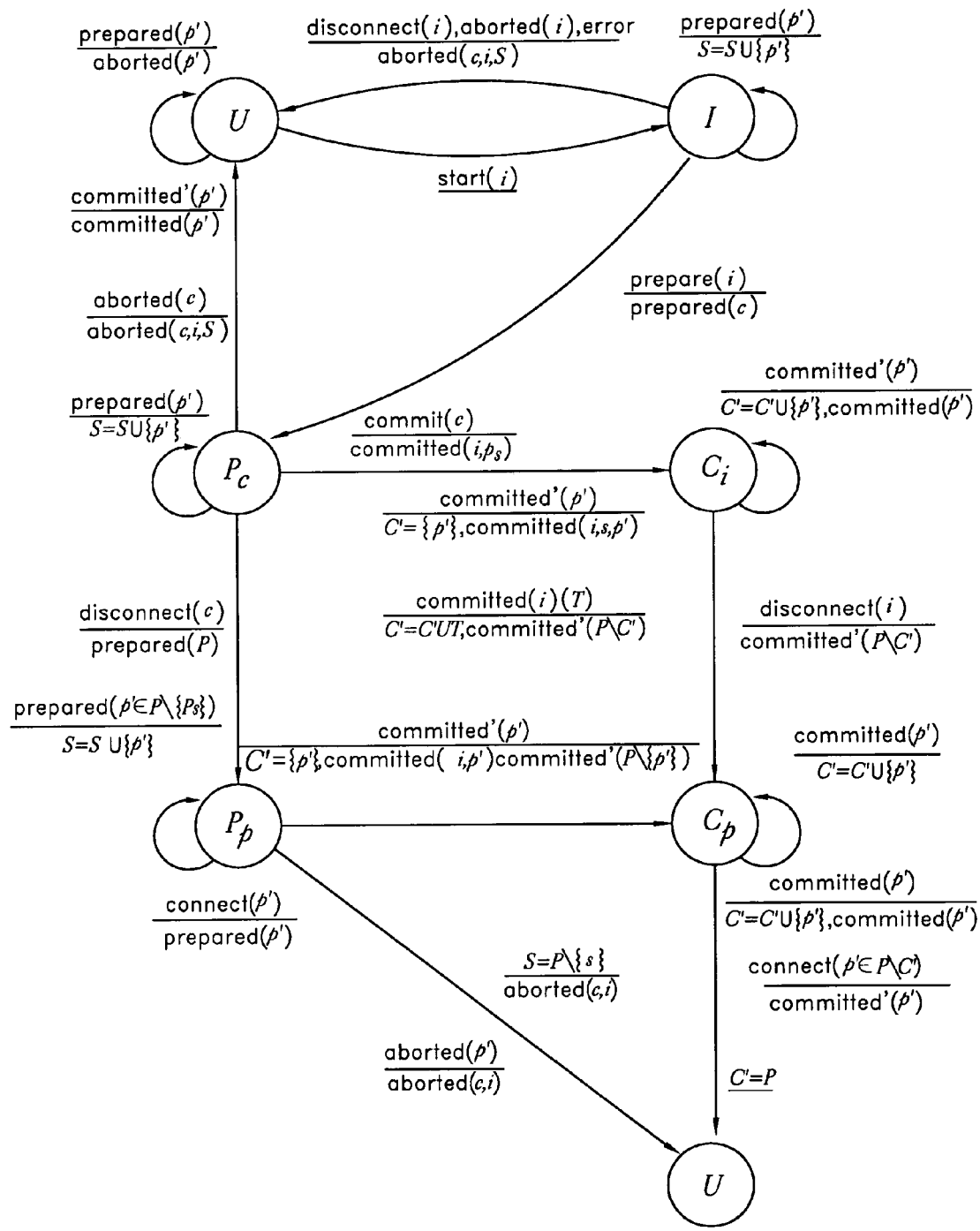
FIG. 7 illustrates an exemplary state diagram of a participant for the two-phase commit version 2 protocol.

FIG. 7 is a state diagram illustrating an unknown state U, an initial state I, a first prepared state Pc, a second prepared state Pp, a first committed state Ci, and a second committed state Cp of the remote participant p.

1. The Unknown State U

The participant p is in the unknown state U before and after the transaction. In the unknown state U, the participant p may receive committed' message from another participant p' (for example, committed'(p')). The "committed'" message from another participant p' indicates that the other participant p' has committed to the transaction but is waiting to find out the status of the participant p before cleaning its log. Since the participant p is already in the unknown state with a clean log, it determines that it committed to the transaction and sends a "committed" message to the other participant p' (for example, committed(p')).

In the unknown state U, the participant p may receive a "prepared" message from another participant p' (for example, prepared(p')). As discussed in detail below, the participant p would not have cleaned its log and transitioned to the unknown state U unless it had received "committed" messages from all of the participants. However, the "prepared" message from the other participant p' indicates that the other participant p' has not committed the transaction. Thus, the participant p determines that the transaction was aborted and sends an "aborted" message to the other participant p' (for example, aborted(p')).

In one embodiment, the participant p receives a start message from the initiator i (for example, start(i)) to signal the beginning of the transaction. In response, the participant p transitions to the initial state I. In other embodiments, the initiator i does not send a start message to the participant p. Instead, the participant p transitions to the initial state I when it receives any message referencing the transaction. In such embodiments, messages in the transaction are no longer delivered to the participant p once the transaction is aborted to prevent the participant p from starting the aborted transaction.

2. The Initial State I

In the initial state I, the participant p performs the operations associated with the transaction. In one embodiment, the initiator i sends one or more request to the participant p to perform tasks for the transaction. In a distributed file system, for example, the initiator i may send requests to the participant p to read data blocks, allocate space for data blocks, write data blocks, calculate parity data, store parity data, send messages to another participant, combinations of the forgoing, or the like. If the participant p has an error while performing the transaction, becomes disconnected from the initiator i (for example, disconnect(i)), or receives an "aborted" message from the initiator i (for example, aborted(i)), the participant aborts the transaction and sends an "aborted" message to the coordinator c, the initiator i, and the participants in the set of known prepared participants S from which it has received "prepared" messages (for example, aborted(c, i, S)). The participant p then transitions back to the unknown state U.

While in the initial state I, the participant p may receive a "prepared" message from another participant p' (for example, prepared(p')). For example, another participant p' may send the prepared(p') message to the participants in P if it received a "prepare" message from the initiator i and then disconnected from the coordinator c. In response to receiving the prepared(p') message, the participant p adds the other participant p' to the set of known prepared participants S (for example, S=S∪{p'}) for use in the second prepared state Pp.

As discussed above, the initiator i can add participants to P as the transaction is being executed. After the participants in P have performed the operations associated with the transaction, the initiator i sends a "prepare" message (for example, prepare(i)) to the participants in P. The prepare(i) message includes the final set of participants in P. If the participant p has not transitioned back to the unknown state U, the participant p responds to the prepare(i) message by logging the prepare, sending a "prepared" message to the coordinator c (for example, prepared(c)) and transitioning to the first prepared state Pc.

Although not shown, in other embodiments the participant p only transitions to the first prepared state Pc from the initial state I if S=Ø. In such embodiments, if S≠Ø, the participant p may transition directly to the second prepared state Pp.

3. The First Prepared State Pc

In the first prepared state Pc, the participant p awaits the outcome of the transaction. The coordinator c may notify the participant p of the outcome by sending a "commit" or "aborted" message to the participant p (for example, commit (c) or aborted(c)). In response to commit(c), the participant p sends a "committed" message to the initiator i and to the shared participant $p_s$ (for example, committed(i, $p_s$)). Thus, as discussed in detail below, the shared participant $p_s$ is notified of the outcome of the transaction. The participant p then transitions to the first committed state Ci. In response to the "aborted" message from the coordinator, the participant p sends an "aborted" message to the coordinator c, the initiator i, and the participants in S. The participant p then transitions back to the unknown state U.

Rather than receiving notice of the transaction's outcome from the coordinator c, another participant p' may notify the participant p of the outcome by sending a committed'(p') message. In response to the committed'(p') message, the participant p adds the other participant p' to the set of known committed participants C' (for example, C'={p'}), sends a "committed" message to the initiator i, the shared participant $p_s$, and the other participant p' (for example, committed(i, $p_s$, p')), and transitions to the first committed state Ci.

In the first prepared state Pc, the participant p may receive a prepared(p') message from another participant p'. In response, the participant p adds the other participant p' to the set of known prepared participants S (for example, S=S∪{p'}) allowing participant p to track the participants from which it has received a "prepared" message if it transitions to the second prepared state Pp. In the first prepared state Pc, the participant p may detect that it has become disconnected from the coordinator (for example, disconnect (c)). In response, the participant sends a "prepared" message to all participants in P (for example, prepared (P)) and transitions to Pp.

4. The Second Prepared State Pp

In one embodiment, the second prepared state Pp is used when the participant p loses its connection with the coordinator c. As noted above, only the participants can notify the shared participant $p_s$ of the outcome of the transaction. Participants in the second prepared state Pp are not committed. Thus, once the participant p knows that all the participants in P except for the shared participant $p_s$ are in the second prepared state Pp (for example, S=P\{$p_s$}), the participant p knows that the shared participant $p_s$ is not committed. The participant p can then abort the transaction, send an "aborted" message to the coordinator c and the initiator i (for example, aborted(c, i)), and transition back to the unknown state U. Thus, once all of the non-shared participants in P are disconnected from the coordinator c, the non-shared participants resolve the transaction by aborting without further instructions from the initiator i or coordinator c.

In the second prepared state Pp, the participant p may receive a "committed" or "aborted" message from another participant p' (for example, committed'(p') or aborted(p')). In response to receiving the committed'(p') message, the participant p adds the other participant p' to the set of known committed participants C' (for example, C'={p'}) and sends a "committed" message to the initiator i and the other participant p' (for example, committed(i, p')). To find out which of the other participants in P have also committed, the participant p sends a committed' message to the participants in P (for example, committed'(P\{p'})). The participant p then transitions to the second committed state Cp.

Sending a "prepared" message is how the participant p asks for the outcome of the transaction. If the other participant p' has aborted the transaction, the other participant p' sends the aborted(p') message to the participant p in response to a "prepared" message (not shown) from the participant p. In response to receiving the aborted(p') message, the participant p aborts the transaction, sends an "aborted" message to the coordinator c and the initiator i (for example, aborted(c, i)), and transitions to the unknown state U.

In the second prepared state Pp, the participant p may detect a connection to another participant p' (for example, connect(p')). In response, the participant p sends a "prepared" message to the other participant p' (for example, prepared (p')). When the participant p and the other participant p' connect, the other participant p' also sends a "prepared" message to the participant p. When the participant receives a "prepared" message from another participant p' other than the shared participant p' (for example, prepared(p'∈P\{$p_s$})), the participant adds the other participant p' to the set of known prepared participants S (for example, S=S∪p').

5. Garbage Collection and Restart

The participant p records messages sent or received during the commit protocol in a log. The participant p can provide the information in the log to another participant p' that may not have received one or more messages sent, for example, when the other participant p' was disconnected. The participant p can also use the information when the participant p restarts after a disconnect or failure to determine the outcome of the transaction.

In one embodiment, when the participant p restarts after a failure, the participant p checks its log for a prepare block, a done block, a commit block, or a combination of the forgoing. If the log does not have a prepare block, the participant p restarts in the unknown state U. The participant p also restarts in the unknown state U if the log has a done block. If the log has a prepare block, but no commit block or done block, the participant restarts in the second prepared state Pp. If the log has a prepare block and a commit block, but no done block, the participant p restarts in the second committed state Cp.

The first committed state Ci and the second committed state Cp are garbage collection states. In these states, the participant p has already committed the transaction. However the participant p waits to clear its log until it is sure that the information stored therein will not be needed. The set of known committed participants C' includes the participants that the participant p knows have also committed the transaction. When the participant p receives a committed' from another participant p' (for example, committed'(p')), the participant p adds the other participant p' to the set of known committed participants C' (for example, C'=C∪{p'}) and sends a "committed" message to the other participant p' (for example, committed(p')).

In the first committed state Ci, the participant p waits to receive a "committed" message from the initiator i that includes a set T of participants that the initiator i knows have committed (for example, committed(i)(T)). In response to receiving the committed(i)(T) message, the participant p adds the participants in T to C' (for example, C'=C'∪T). If C'∪T is not all of the participants in P, the participant sends a committed' message to query the participants it does not know have committed (for example, committed'(P\C')). The participant p also sends the committed'(P\C') message if it detects a disconnect from the initiator i. The participant p then transitions to the second committed state Cp.

In the second committed state Cp, the participant p may receive a "committed" message from another participant p' (for example, committed(p')). In response, the participant p adds the other participant p' to the set of known committed participants C' (for example, C'=C'∪{p'}). The participant p may also detect a connection to another participant p' that is not included in the set of known committed participants C' (for example, connect(p'∈P\C'). In response, the participant p queries whether the other participant p' has committed by sending it a committed' message (for example, committed' (p')). When C'=P, the participant p can clean its log and transition to the unknown state U.

The following exemplary pseudocode illustrates one embodiment of the participant p:

```
function abort(S):
    log abort
    send aborted to S ∪ {i, c}
    set state to U
function commit_i(C', P):
    log commit
    send committed to {i, p_s}
    set state to (Ci, C', P)
function commit_p(C', P):
    send committed' to P \ C'
    set state to (Cp, C', P)
in state U:
    on committed' from p':        send committed to p'
    on prepared from p':          send aborted to p'
    on start from i:              set state to (I, ∅)
in state (I, S):
    on disconnect from i:         abort(S)
    on local failure:             abort(S)
    on aborted from i:            abort(S)
    on prepared from p':          set state to (I, S ∪ {p'})
    on prepare(P) from i:         log prepare
                                  send prepared to c
                                  set state to (Pc, S, P)
in state (Pc, S, P):
    on disconnect from c:         send prepared to P
                                  set state to (Pp, S, P)
    on aborted from c:            abort(S)
    on commit from c:             commit_i(∅, P)
    on committed' from p' ∈ P:    commit_i({p'}, P)
                                  send committed to p'
    on prepared from p' ∈ P:      set state to (Pc, S ∪ {p'}, P)
in state (Pp, S, P):
    if S = P \ {p_s}:             abort(∅)
    on connect to p' ∈ P:         send prepared to p'
    on aborted from p' ∈ P:       abort(∅)
    on committed' from p' ∈ P:    log commit
                                  commit_p({p'}, P)
                                  send committed to {i, p'}
    on prepared from p' ∈ P \ {p_s}: set state to (Pp, S ∪ {p'}, P)
in state (Ci, C', P):
    on committed(T) from i:       commit_p(C' ∪ T, P)
    on disconnect from i:         commit_p(C', P)
    on committed' from p' ∈ P:    set state to (Ci, C' ∪ {p'}, P)
                                  send committed to p'
in state (Cp, C', P):
    if C' = P:                    log done
                                  set state to U
    on connect to p' ∈ P \ C':    send committed' to p'
    on committed from p' ∈ P:     set state to (Cp, C' ∪ {p'}, P)
    on committed' from p' ∈ P:    set state to (Cp, C' ∪ {p'}, P)
                                  send committed to p'
```

E. The Shared Participant

As discussed above, the transaction may include a shared participant $p_s$. The shared participant $p_s$ is on the same node as the coordinator c and the initiator i. The coordinator c does not send a "commit" message to the shared participant $p_s$. Instead, the other participants in P inform the shared participant $p_s$ that the transaction is committed.

Figure 8:
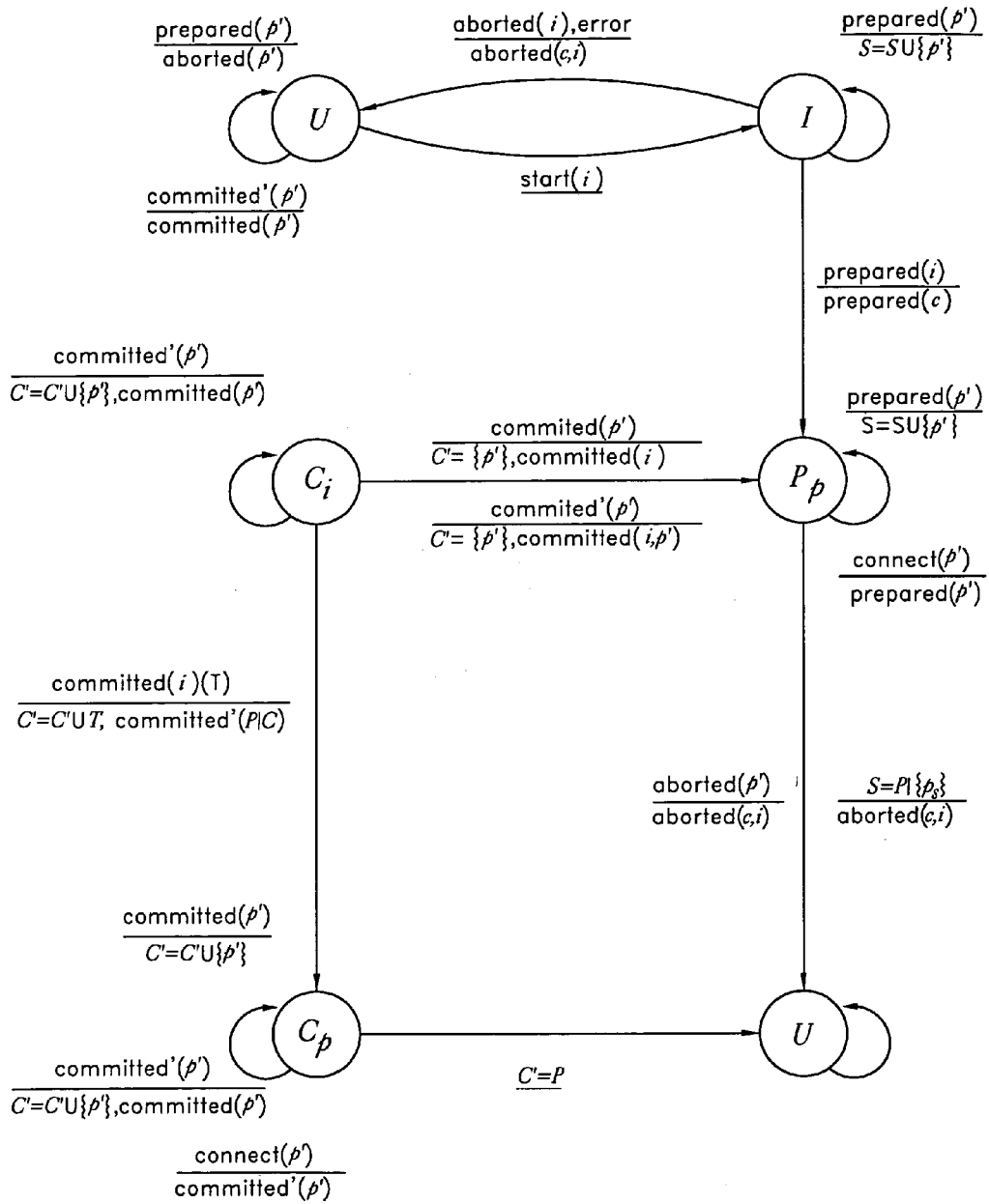
FIG. 8 illustrates an exemplary state diagram of a shared participant for the two-phase commit version 2 protocol.

FIG. 8 is a state diagram illustrating the states of the shared participant $p_s$ according to one embodiment. The shared participant $p_s$ operates similar to a remote participant p and can be in the unknown state U, the initial state I, the second prepared state Pp, the first committed state Ci, and the second committed state Cp as discussed above in relation to FIG. 7. However, since the shared participant $p_s$ does not receive a "commit" message from the coordinator c, the shared participant $p_s$ does not enter the first prepared state Pc. Rather, when the shared participant $p_s$ receives the prepare(i) message from the initiator i, the shared participant $p_s$ transitions directly to the second prepared state Pp.

Since the shared participant $p_s$ does not enter the first prepared state Pc, the shared participant transitions to the first committed state Ci directly from the second prepared state Pp. Thus, upon receiving the committed'(p') message while in the second prepared state Pp, the shared participant $p_s$ transitions to the first committed state Ci. In the second prepared state Pp, the shared participant $p_s$ may learn of the outcome of the transaction by receiving a "committed" message from another participant p' (for example, committed(p')). In response, the shared participant $p_s$ adds the other participant p' to the set of known committed participants C' (for example, C'={p}), sends a "committed" message to the initiator i, and transitions to the first committed state Ci.

Like the remote participant p, upon detecting connect(p'), the shared participant $p_s$ asks the other participant p' the outcome of the transaction by sending a prepared(p') message. As discussed above, if the other participant p' has not resolved the transaction, it will ignore the prepared(p') message from the shared participant $p_s$. If the other participant p' has aborted the transaction, it will send aborted(p') to the shared participant $p_s$.

An artisan will recognize from the disclosure herein that there are other differences between the shared participant $p_s$ and the remote participant p discussed above. For example, since the shared participant $p_s$ is on the same node as the coordinator c and the initiator i, the shared participant $p_s$ will not detect disconnect(i). Thus, the shared participant $p_s$ does not respond to disconnect(i) in, for example, the unknown state U or the first committed state Ci.

In one embodiment, the shared participant $p_s$ restarts as discussed above in relation to the remote participant p.

The following exemplary pseudocode illustrates one embodiment of the shared participant $p_s$:

```
function abort( ):
    log abort
    send aborted to {i, c}
    set state to U
function commit_i(C', P):
    log commit
    send committed to i
    set state to (Ci, C', P)
function commit_p(C', P):
    send committed' to P \ C'
    set state to (Cp, C', P)
in state U:
    on committed' from p':        send committed to p'
    on prepared from p':          send aborted to p'
    on start from i:              set state to (I, ∅)
in state (I, S):
    on local failure:             abort( )
    on aborted from i:            abort( )
    on prepared from p':          set state to (I, S ∪ {p'})
    on prepare(P) from i:         log prepare
                                  send prepared to c
                                  set state to (Pp, S, P)
in state (Pp, S, P):
    if S = P \ {p_s}:             abort( )
    on connect to p' ∈ P:         send prepared to p'
    on aborted from p' ∈ P:       abort( )
    on committed from p' ∈ P:     commit_i({p'}, P)
    on committed' from p' ∈ P:    commit_i({p'}, P)
                                  send committed to p'
    on prepared from p' ∈ P:      set state to (Pp, S ∪ {p'}, P)
in state (Ci, C', P):
    on committed(T) from i:       commit_p(C' ∪ T, P)
    on committed' from p' ∈ P:    set state to (Ci, C' ∪ {p'}, P)
                                  send committed to p'
```

-continued

```
in state (Cp, C', P):
    if C' = P:                      log done
                                    set state to U
    on connect to p' ∈ P:           send committed' to p'
    on committed from p' ∈ P:       set state to (Cp, C' ∪ {p'}, P)
    on committed' from p' ∈ P:      set state to (Cp, C' ∪ {p'}, P)
                                    send committed to p'
```

IV. 2.5-Phase Commit Protocol

While the MM2PC and the 2PCV2 protocols provide single-failure non-blocking commitment protocols, it may be useful to provide for double-failure tolerance. The 2.5 Phase Commit ("2.5PC") protocol provides a double-failure non-blocking atomic commitment protocol. The 2.5PC protocol includes an initiator i, a coordinator c, a distributor d, as well as a set of participants $P=\{p_1, p_2, \ldots p_n\}$. In the 2.5PC protocol, each party is located on a different node from the other parties. It is recognized, however, that the 2.5PC protocol may be implemented such that two parties share a node (for example, the coordinator c shares a machine with one participant $p_2$), but such implementations would only provide single-failure tolerance.

A. 2.5PC Protocol Exemplary Timing Chart

Figure 9:
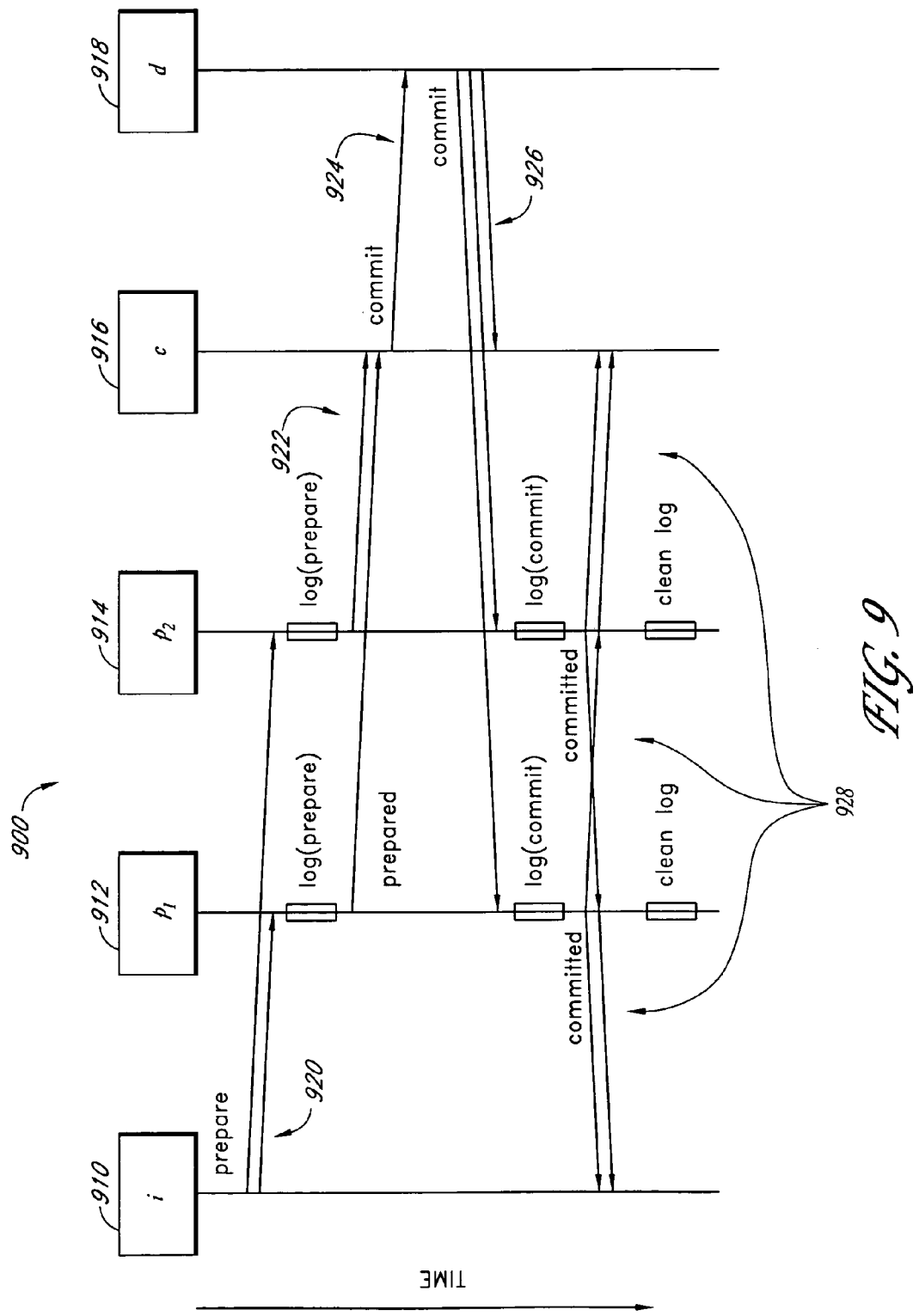
FIG. 9 illustrates an exemplary timing chart of a transaction between an initiator, two participants, a coordinator, and a distributor using a 2.5 phase commit protocol.

FIG. 9 illustrates an exemplary timing chart according to one embodiment of a 2.5PC protocol 900 for a transaction involving an initiator 910 (shown as "i"), a first participant 912 (shown as "$p_1$"), a second participant 914 (shown as "$p_2$"), a coordinator 916 (shown as "c"), and a distributor 918 (shown as "d"). The coordinator 916 and the distributor 918 are on separate nodes. If the coordinator 916 and the distributor 918 do not share a node with the first participant 912 or the second participant 914, then the commit protocol 900 allows for double-failure non-blocking.

The initiator 910 sends "prepare" messages 920 (two shown) to the first participant 912 and the second participant 914. The first participant 912 and the second participant 914 log their respective "prepare" messages 920 and determine whether they are prepared to commit the transaction. If the first participant 912 can commit the transaction, the first participant 912 sends a "prepared" message 922 to the coordinator 916. If the second participant 914 can commit the transaction, the second participant 914 sends a "prepared" message 922 to the coordinator 916. If the coordinator receives both of the "prepared" messages 922, the coordinator 916 sends a "commit" message 924 to the distributor 918.

If the coordinator 916 and one of the participants 912, 914 were to fail (for example, a double-failure) after the coordinator 916 sends the "commit" message 924, the distributor 918 knows the coordinator's 916 decision and can resolve the transaction. Thus, the protocol 900 is double-failure non-blocking. In response to the "commit" message 924 from the coordinator 916, the distributor 918 sends "commit" messages 926 (three shown) to the first participant 912, the second participant 914, and the coordinator 916.

After receiving the "commit" messages 926 from the distributor 918, the first participant 912 and the second participant 914 respectively log the "commits" and send "committed" messages 928 (six shown) to each other, to the coordinator 916, and to the initiator 910. Upon receiving a "committed" message 928, the first participant 912 and the second participant 914 clear their respective logs and the 2.5PC protocol 900 ends.

The exemplary timing chart shown in FIG. 9 illustrates the 2.5PC protocol 900 when no failures occur. However, if one or more of the participants 912, 914 fails or disconnects, the coordinator 916 aborts the transaction and informs the distributor 918. The distributor 918 then informs the remaining participants 912, 914.

If the coordinator 916 fails or disconnects before informing the distributor 918 of its decision, the distributor 918 aborts because it does not know if all the participants 912, 914 prepared successfully. However, the coordinator 916 can also send "abort" or "commit" messages to the participants 912, 914. Therefore, as discussed in detail below, when the coordinator 916 is disconnected from the distributor 918, the participants 912, 914 decide whether to accept "commit" or "abort" messages from the coordinator 916 or the distributor 918. If the participants 912, 914 decide to accept the decision of the distributor 918, the distributor sends an "abort" message to the participants 912, 914.

If the coordinator 916 loses its connection with the distributor 918 before sending the "commit" message 924, the coordinator 916 aborts. Since the distributor also aborts, the coordinator 916 sends "abort" messages to the participants 912, 914 without waiting for the participants to decide whether to accept the decision of the coordinator 916.

If, on the other hand, the coordinator 916 loses its connection to the distributor 918 after sending the "commit" message 924, the coordinator 916 is still committed. However, the coordinator 916 does not know whether the distributor 918 received the "commit" message 924. If the distributor 918 did receive the "commit" message 924, it may have sent the "commit" messages 926 to one or more of the participants 912, 914. If the distributor 918 did not receive the "commit" message 924, the distributor 918 may abort the transaction when the participants 912, 914 decide to accept the distributor's 918 decision. Thus, the coordinator 916 waits for the participants 912, 914 to decide to accept its decision before committing the transaction.

The participants 912, 914 vote to determine whether to accept the decision (for example, commit or abort) of the coordinator 916 or the distributor 918. For example, if the coordinator 916 receives a majority of the votes, it will send its decision to the participants 912, 914. If, on the other hand, the distributor 918 receives the majority of votes, it will send its decision to the participants 912, 914. The participants 912, 914 will vote for the coordinator 916 if they loose their respective connections to the distributor 918. The participants 912, 914 will vote for the distributor 918 if they lose their respective connections with the coordinator 916. Otherwise, the participants 912, 914 will vote for the first party (for example, either the coordinator 916 or the distributor 918) to ask for its vote. In one embodiment, only the distributor 918 asks for votes to avoid a split vote.

If one or more of the participants 912, 914 are disconnected from the coordinator 916, the distributor 918, or both, neither the coordinator 916 nor the distributor 918 may receive the majority of the votes. Thus, the participants 912, 914 send their respective votes to both the coordinator 916 and the distributor 918. When either the coordinator 916 or the distributor 918 realizes that it cannot receive the majority of votes, it bows out of the election and notifies the participants 912, 914.

If both the participants 912, 914 lose their connections with both the coordinator 916 and the distributor 918, the participants 912, 914 deterministically resolve the transaction among themselves as discussed above.

FIGS. 10-12D illustrate state diagrams according to one embodiment of a 2.5PC protocol. Parties in a transaction using the 2.5PC protocol include a coordinator c, a distributor d, one or more participant p selected from the set defined by $\{p_1, p_2, \ldots, p_n\}$, and an initiator i.

B. Coordinator States

Figure 10:
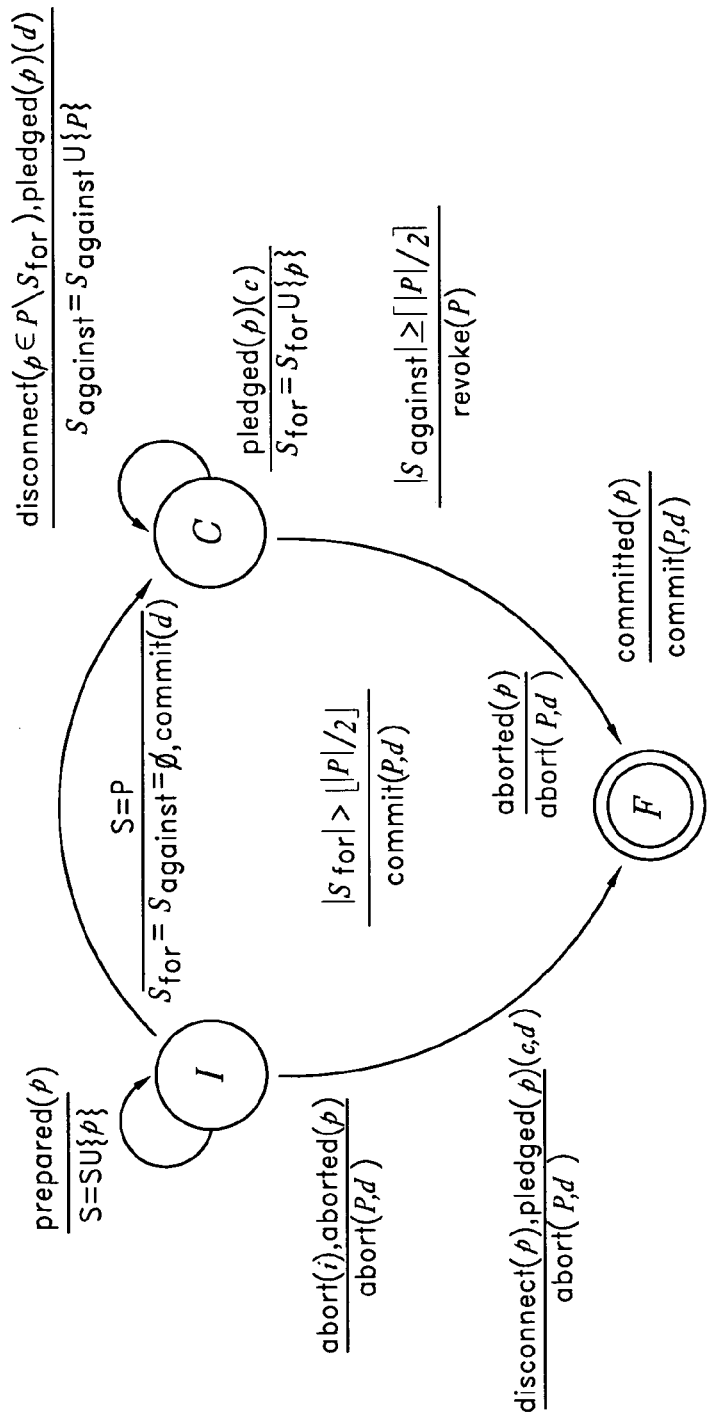
FIG. 10 illustrates an exemplary state diagram of a coordinator for the 2.5 phase commit protocol.

FIG. 10 is a state diagram illustrating an initial state I, a commit state C and a final state F of the coordinator c during execution of the commit protocol. The coordinator c can be in a state "$s_c$" defined by:

$$s_c \in \{(I, S) | S \subset P\}$$

$$\cup \{(C, S_{for}, S_{against}) | S_{for}, S_{against} \subset P; S_{for} \cap S_{against} = \emptyset\}$$

$$\cup \{F\}$$

wherein P is a set of participants defined by $P=\{p_1, p_2, \ldots, p_n\}$. The variable S is a proper subset of the participants in P for which the coordinator c has received "prepared" messages. In the commit state C, the coordinator c keeps two mutually exclusive proper subsets $S_{for}$ and $S_{against}$ of the participants in P. The variable $S_{for}$ includes participants that vote for the coordinator c and the variable $S_{against}$ includes participants that vote for the distributor d.

1. The Initial State I

As illustrated in FIG. 10, the coordinator c starts in the initial state I. In the initial state I, the coordinator c may receive a "prepared" message from one of the participants p (for example, prepared(p)). In response, the coordinator c adds the participant p to the set of known prepared participants S (for example, $S=S \cup \{p\}$). Once S=P, the coordinator c sends a "commit" message to the distributor d (for example, commit(d)) and transitions to the commit state C.

While in the initial state I, the coordinator c may detect a disconnect from one of the participants p (for example, disconnect(p)), or may receive an "abort" message from the initiator i (for example, abort(i)), an "aborted" message from the participant p (for example, aborted(p)), or a pledged message from one of the participants p (for example, pledged(p)). In response, the coordinator c aborts the transaction and sends an "abort" message to the participants in P and the distributor d (for example, abort(P, d)). The coordinator c then transitions to the final state F.

The "pledged" message from one of the participants p may be a vote from the participant p for the coordinator c or the distributor d. Either way, the coordinator c knows that the "pledged" message is in response to a "pledge" message (discussed below) from the distributor d in the event of a failure. Thus, the coordinator c aborts.

2. The Commit State C

In the commit state C, the coordinator c expects the transaction to be committed but waits in the commit state C in case the distributor d fails and the participants in P need the coordinator c to resolve the transaction. While in the commit state C, the coordinator c may receive the "pledged" message from one of the participants p. As discussed above, the coordinator c adds the participant p to the set of participants voting for the coordinator $S_{for}$ if the participant p pledges its vote to the coordinator c (for example, pledged(p)(c)). Once $|S_{for}| > \lfloor |P|/2 \rfloor$, the coordinator c commits the transaction and sends a "commit" message to the participants in P and the distributor d (for example, commit(P, d)). The coordinator c then transitions to the final state F.

If the participant p pledges its vote to the distributor d (for example, pledged(p)(d)), the coordinator c adds the participant p to set of participants voting for the distributor $S_{against}$. The coordinator c may also detect that it has disconnected from one of the participants (for example, disconnect(p)). If the participant p is not in $S_{for}$ or $S_{against}$, in one embodiment, the coordinator c adds the participant p to $S_{against}$. If $|S_{against}| \geq \lceil |P|/2 \rceil$, the coordinator c revokes its participation in the election and notifies the participants in P (for example, revoke(P)). The coordinator c then transitions to the final state F.

In the commit state C, the coordinator c may receive the "aborted" message or a "committed" message from one of the participants p (for example, aborted(p) or committed(p)). In response to the "aborted" message, the coordinator c aborts the transaction, sends the "abort" message to all of the participants in P and the distributor d (for example, abort(P, d)) and transitions to the final state F. In response to the "committed" message, the coordinator c commits the transaction, sends a "commit" message to the participants in P and the distributor d (for example, commit(P, d)), and transitions to the final state F.

The following exemplary pseudocode illustrates one embodiment of the coordinator c:

```
function abort( ):
    send abort to P ∪ {d}
    set state to F
function commit( ):
    send commit to P ∪ {d}
    set state to F
function revoke( ):
    send revoke to P
    set state to F
in state (I, S):
    on disconnect from p ∈ P:         abort( )
    on pledged(c) from p ∈ P:          abort( )
    on pledged(d) from p ∈ P:          abort( )
    on abort from i:                   abort( )
    on aborted from p ∈ P:             abort( )
    on prepared from p ∈ P:
        if S = P:                      send commit to d
                                       set state to (C, ∅, ∅)
in state (C, S_for, S_against)
    on disconnect from p ∈ P \ S_for:  set state to (C, S_for, S_against ∪ {p})
    on pledged(c) from p ∈ P:          set state to (C, S_for ∪ {p}, S_against)
    on pledged(d) from p ∈ P:          set state to (C, S_for, S_against ∪ {p})
    if |S_for| > ⌊|P|/2⌋:              commit( )
    if |S_against| > ⌈|P|/2⌉:          revoke( )
    on aborted from p ∈ P:             abort( )
    on committed from p ∈ P:           commit( )
on start:                              set state to (I, ∅)
```

It is recognized that not all error cases are shown in the above pseudocode. In the embodiments discussed above, non-handled messages are ignored. For example, the above pseudocode does not address a failure of the connection between the coordinator c and the distributor d. If the connection goes down, the distributor d starts seeking pledges and the coordinator c starts receiving "pledged" messages or "aborted" messages from one of the participants p (for example, pledged(p) or aborted(p)). Further, the above pseudocode does not have a restart procedure for the coordinator c. If the coordinator c fails, the participants ignore it. When the coordinator c restarts, it has no knowledge of the transaction, but the participants do not care; and if the coordinator then aborts, the coordinator c does not inform the distributor d when it aborts. The distributor d is instead notified of the abort from the participants.

C. Distributor States

Figure 11:
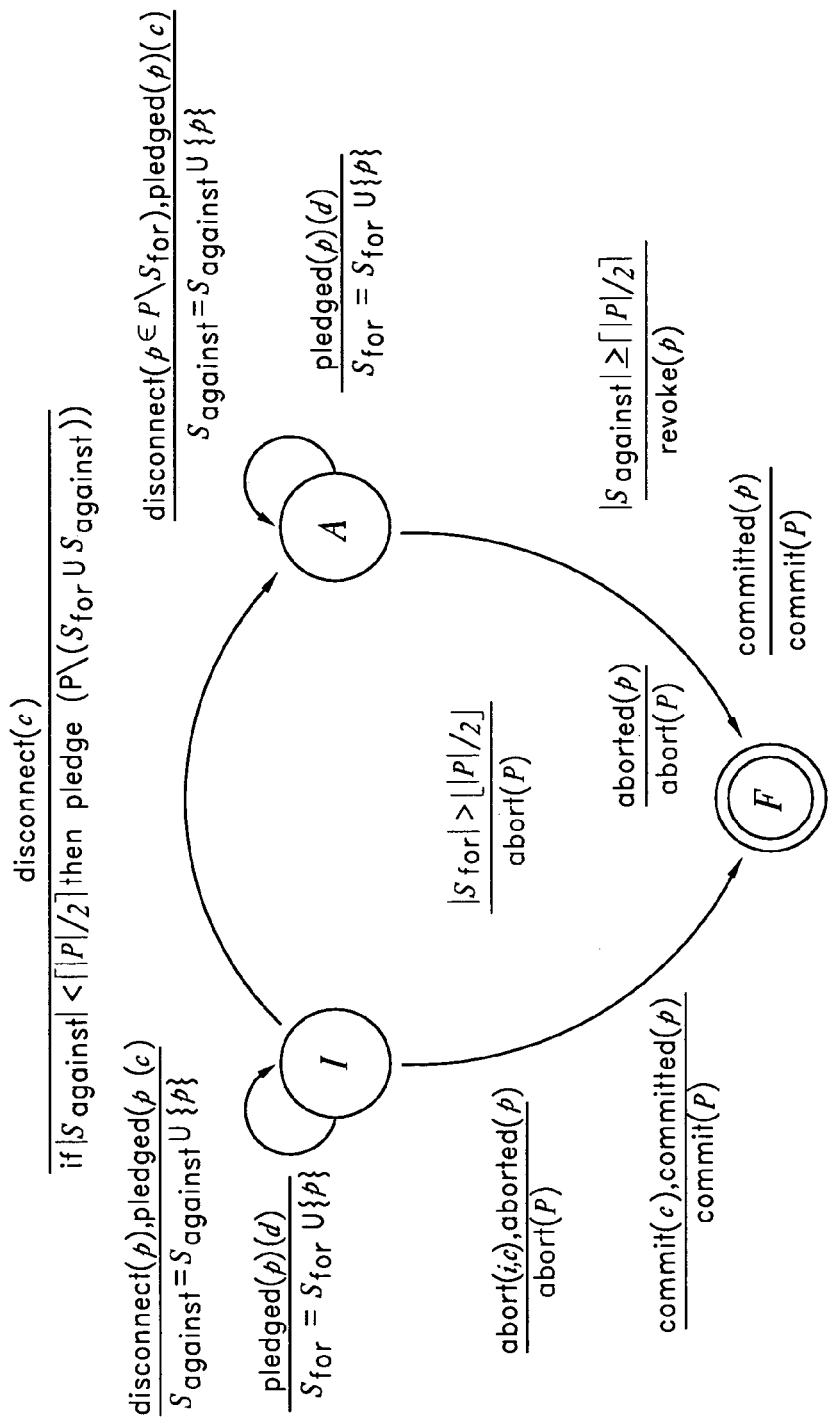
FIG. 11 illustrates an exemplary state diagram of a distributor for the 2.5 phase commit protocol.

FIG. 11 is a state diagram illustrating an initial state I, an abort state A, and a final state F of the distributor d during execution of the commit protocol. The distributor d can be in a state "$s_d$" defined by:

$$s_d \in \{(r, S_{for}, S_{against}) | r \in \{I, A\}; S_{for}, S_{against} \subset P; S_{for} \cap S_{against} = \emptyset\} \cup \{F\}$$

wherein the distributor d adds participants that vote for the distributor d to the set of participants voting for the distributor $S_{for}$ and adds participants that vote for the coordinator c to the set of participants voting for the coordinator $S_{against}$.

1. The Initial State I

The distributor d starts in the initial state I where it can detect a disconnect from a participant p (for example, disconnect(p)) or receive pledged messages from the participant p for the coordinator c or the distributor d (for example, pledged (p)(c) or pledged(p)(d)). In response, the distributor d adds the participant p to the corresponding set $S_{for}$ or $S_{against}$, as described above.

If the distributor d detects a disconnect from the coordinator c (for example, disconnect(c)) while in the initial state I, the distributor d checks to see if the number of votes for the coordinator are less than the majority and then requests votes from the participants in P that have not yet voted by sending them a "pledge" message (for example, pledge(P\ $(S_{for} \cup S_{against})$)). The distributor d then transitions to the abort state A where it tries to abort the transaction.

If the distributor d receives an "abort" message from the initiator i or the coordinator c (for example, abort(i, c)) or an "aborted" message from one of the participants p (for example, aborted(p)), the distributor d aborts the transaction. The distributor d then sends an "abort" message to the participants in P (for example, abort(P)) and transitions to the final state F. If, on the other hand, the distributor d receives a "commit" message from the coordinator c (for example, commit(c)) or a "committed" message from one of the participants p (for example, committed(p)), the distributor d commits the transaction. The distributor d then sends a "commit" message to the participants in P (for example, commit(P)) and transitions to the final state F.

2. The Abort State A

In the abort state A, the distributor d tries to get enough votes to abort the transaction. Upon detecting a disconnection from one of the participants p that has not voted for the distributor (for example, disconnect(p∈P\$S_{for}$)), the distributor d adds the participant p to the set of participants voting for the coordinator $S_{against}$. The distributor d may also receive pledged messages from the participant p for the coordinator c or the distributor d (for example, (pledged (p)(c) or pledged (p)(d))). In response, the distributor d adds the participant p to the corresponding sets $S_{for}$ or $S_{against}$, as described above. Once $|S_{against}| \geq \lceil |P|/2 \rceil$, the distributor d revokes its participation in the election and notifies the participants in P (for example, revoke(P)). The distributor d then transitions to the final state F. Once $|S_{for}| > \lfloor |P|/2 \rfloor$, the distributor d aborts the transaction and sends an "abort" message to the participants (for example, abort(P)). The distributor d then transitions to the final state F.

If the distributor d receives the "aborted" message from one of the participants p (for example, aborted(p)) while in the abort state A, the distributor d aborts the transaction, sends the "abort" message to all of the participants (for example, abort (P)) and transitions to the final state F. If the distributor d receives the "committed" message from one of the participants p (for example, committed(p)) while in the abort state A, the distributor d commits the transaction, sends the "commit" message to all of the participants (for example, commit (P)) and transitions to the final state F. Like the coordinator c, the distributor d does not have a restart procedure. If the distributor d fails, the participants in P will ignore it and continue with the commit protocol.

The following exemplary pseudocode illustrates one embodiment of the distributor d:

```
function abort( ):
    send abort to P
    set state to F
function commit( ):
    send commit to P
    set state to F
function revoke( ):
    send revoke to P
    set state to F
in state (I, S_for, S_against):
    on disconnect from c:
        if |S_against|<⌈|P|/2⌉:        send pledge to P \ (S_for ∪ S_against)
                                        set state to (A, S_for, S_against)
    on disconnect from p ∈ P:          set state to (I, S_for, S_against ∪ {p})
    on pledged(c) from p ∈ P:          set state to (I, S_for, S_against ∪ {p})
    on pledged(d) from p ∈ P:          set state to (I, S_for ∪ {p}, S_against)
    on abort from i or c:              abort( )
    on aborted from p ∈ P:             abort( )
    on commit from c:                  commit( )
    on committed from p ∈ P:           commit( )
in state (A, S_for, S_against):
    on disconnect from p ∈ P \ S_for:  set state to (A, S_for, S_against ∪ {p})
    on pledged(c) from p ∈ P:          set state to (A, S_for, S_against ∪ {p})
    on pledged(d) from p ∈ P:          set state to (A, S_for ∪ {p}, S_against)
    if |S_for|>⌊|P|/2⌋:                abort( )
    if |S_against|≥⌈|P|/2⌉:            revoke( )
    on aborted from p ∈ P:             abort( )
    on committed from p ∈ P:           commit( )
on start:                              set state to (I, ∅, ∅)
```

D. Participant States

FIGS. 12A-12D are state diagrams illustrating an initial state I, a first prepared state Pcd, a second prepared state Pc, a third prepared state Pd, a fourth prepared state Pp, an aborted state A, a committed state C and a final state F for a participant p during execution of the commit protocol. The participant p can be in a state "$s_p$" defined by:

$$s_p \in \{(r, S) | r \in \{I, Pcd, Pc, Pd, Pp\}; S \subset P\} \cup \{(A, A')|A' \subset P\} \cup \{(C, C')|C' \subset P\} \cup \{F\}$$

wherein P is a set of participants defined by $P=\{p_1, p_2, \ldots, p_n\}$. The variable S is a proper subset of the participants in P for which the participant p has received "prepared" messages. As discussed below, participants in S are in the fourth prepared state Pp.

In the first prepared state Pcd, the participant p has not pledged its vote to the coordinator c or the distributor d, but is prepared and listening to the coordinator or the distributor. In the second prepared state Pc, the participant p has pledged its vote to the coordinator c and is prepared and listening to the coordinator. In the third prepared state Pd, the participant p has pledged its vote to the distributor d and is prepared and listening to the distributor. The participant p transitions to the fourth prepared state Pp from the second prepared state Pc or the third prepared state Pd when it decides to resolve the transaction deterministically without further input from the coordinator c or the distributor d, showing that it is prepared and listening to the other participants.

1. The Initial State I

Figure 12A:
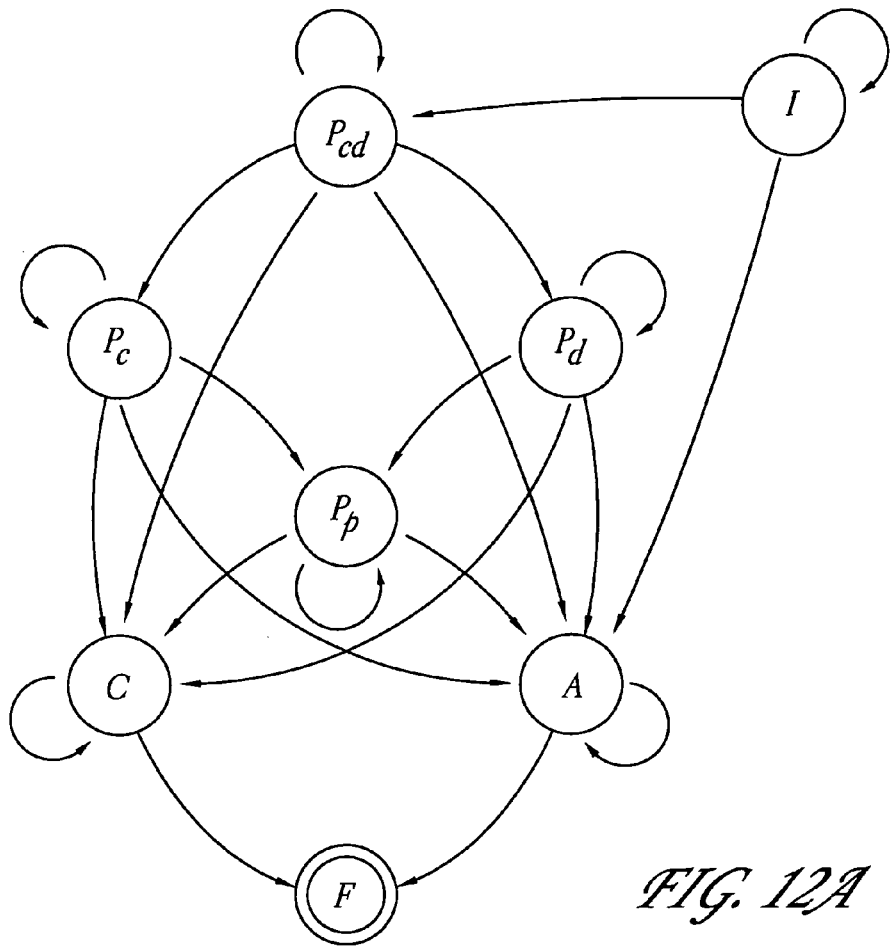
FIG. 12A illustrates an exemplary state diagram of a participant for the 2.5 phase commit protocol.
Figure 12B:
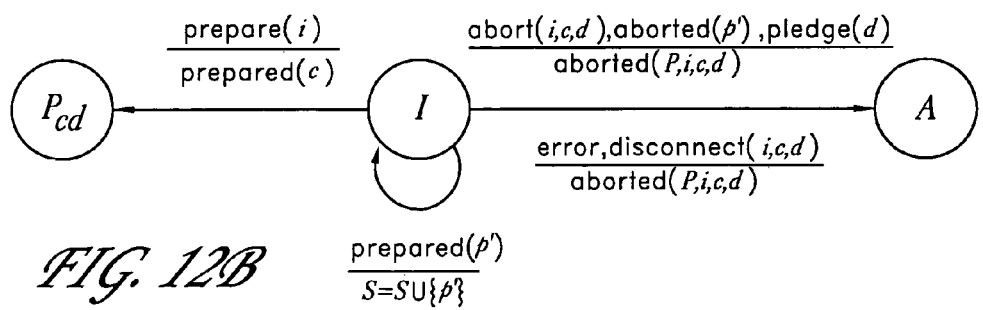
FIG. 12B illustrates an exemplary state diagram of a participant for the 2.5 phase commit protocol.

As illustrated in FIG. 12B, the participant p begins the transaction in the initial state I where it waits for a "prepare" message from the initiator i (for example, prepare(i)). Upon receiving the "prepare" message from the initiator (for example, prepare(i)), the participant p sends a "prepared" message to the coordinator c (for example, prepared(c)) and transitions to the first prepared state Pcd to await an "abort" or "commit" message. If the participant p receives a "prepared" message from another participant p' (for example, prepared (p')), the participant p adds the other participant p' to the set of known prepared participants S (for example, S=S∪{p'}).

In the initial state I, the participant p may receive an "abort" message from the initiator i, the coordinator c, or the distributor d (for example, abort(i, c, d)). The participant p may also receive an "aborted" message from another participant p' (for example, aborted(p')) or a "pledge" message from the distributor d (for example, pledge(d)). The "pledge" message from the distributor indicates that the distributor d has lost its connection with the coordinator c. In response to receiving the "abort" message from the initiator, the coordinator, or the distributor (for example, abort(i, c, d)), the "aborted" message from one of the other participants p' (for example, aborted (p')), or the "pledged" message from the distributor d (for example, pledge(d)), the participant aborts the transaction and transitions to the aborted state A. Upon aborting the transaction, the participant p sends an "aborted" message to the participants in P, the initiator i, the coordinator c, and the distributor d (for example, aborted(P, i, c, d)).

In the initial state I, the participant p may have an error wherein it cannot commit the transaction (for example, error), or it may detect a disconnect from the initiator i, the coordinator c, or the distributor d (for example, disconnect(i, c, d)). In response, the participant p aborts the transaction, sends the "aborted" message to all of the participants in P, the initiator i, the coordinator c, and the distributor (for example, aborted (P, i, c, d)) and transitions to the aborted state A.

2. The First Prepared State Pcd

Figure 12C:
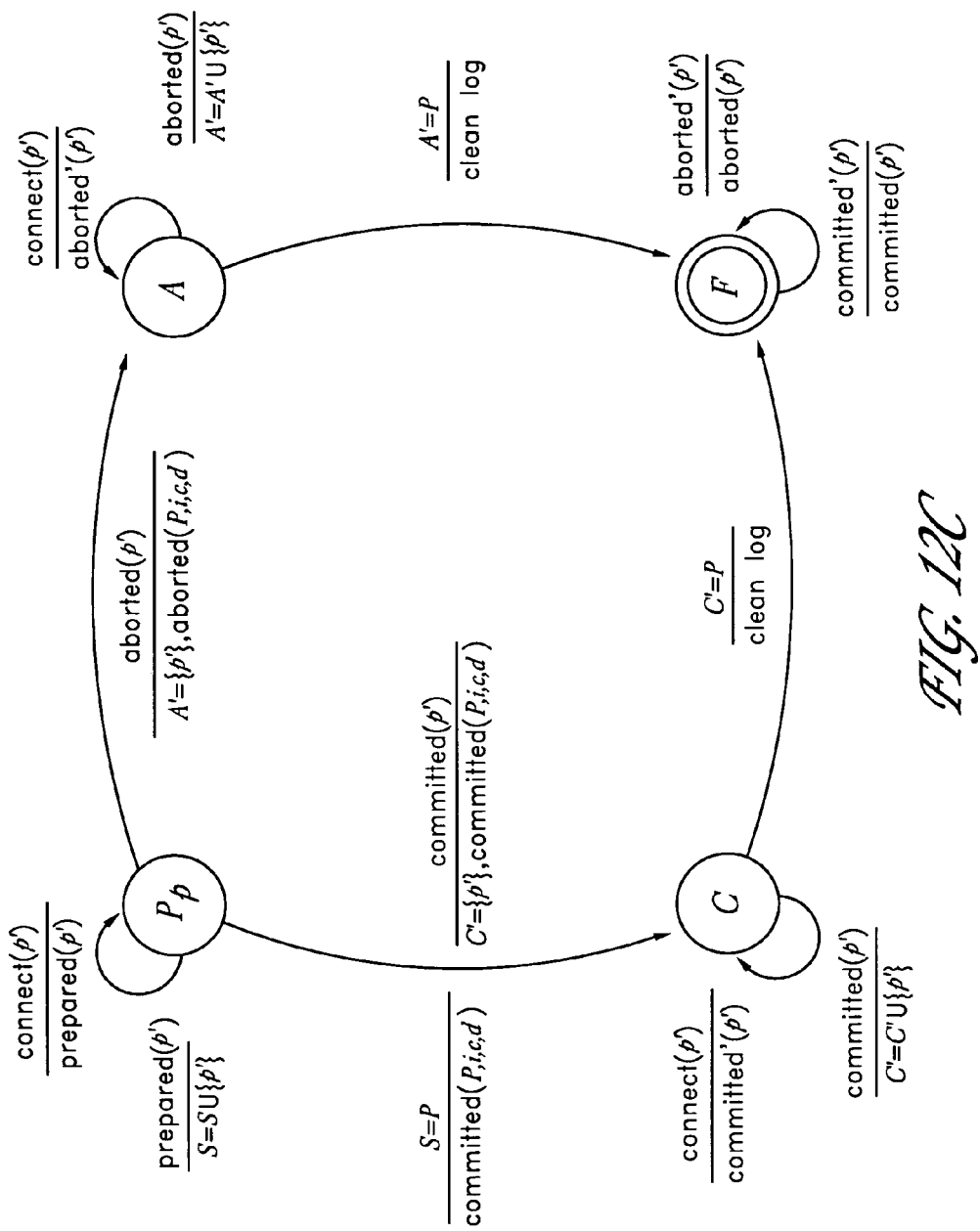
FIG. 12C illustrates an exemplary state diagram of a participant for the 2.5 phase commit protocol.
Figure 12D:
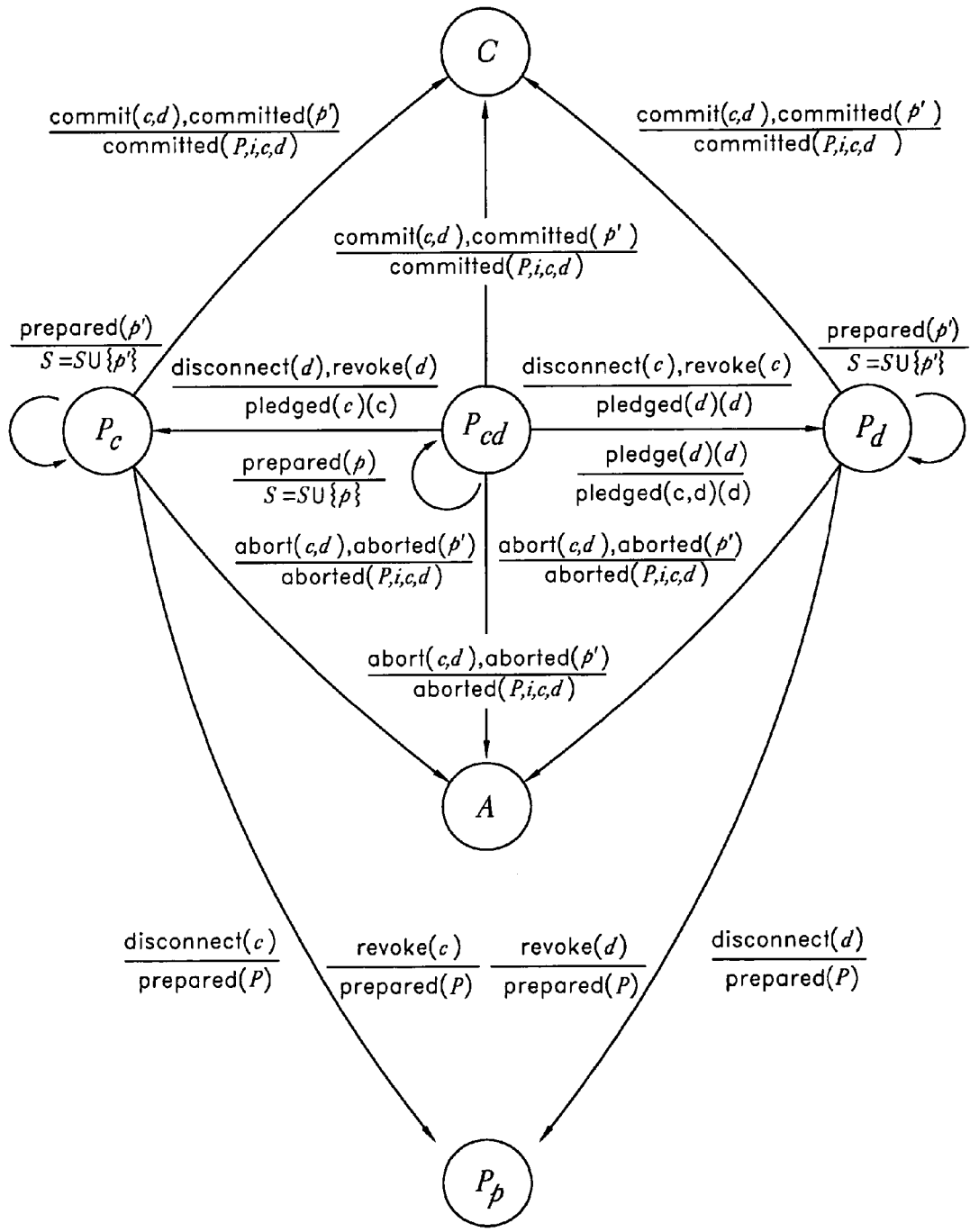
FIG. 12D illustrates an exemplary state diagram of a participant for the 2.5 phase commit protocol.

As illustrated in FIG. 12D, in the first prepared state Pcd, the participant p has not pledged its vote to the coordinator c or the distributor d. If the participant p detects a disconnect from the coordinator c (for example, disconnect(c)) or receives a "revoke" message from the coordinator c (for example, revoke(c)), the participant p then pledges its vote to the distributor d and sends a "pledged" message for the distributor d to the distributor (for example, pledged (d)(d)) and transitions to the third prepared state Pd. If the participant p receives a "pledge" message from the distributor d (for example, pledge(d)), then the participant p pledges its vote to the distributor d and sends a "pledged" message for the distributor d to the coordinator c and the distributor d (for example, pledged(c, d)(d)) and transitions to the third prepared state Pd.

If, while in the first prepared state Pcd, the participant p detects a disconnect from the distributor d (for example, disconnect(d)) or receives a "revoke" message from the distributor d (for example, revoke(d)), the participant p pledges its vote to the coordinator c. The participant p then sends a "pledged" message for the coordinator c (for example, pledged(c)(c)) to the coordinator c, and transitions to the second prepared state Pc.

In the first prepared state Pcd, the participant may receive a "commit" message from the coordinator c or the distributor d (for example, commit(c, d)) or a "committed" message from another participant p' (for example, committed(p')). In response, the participant p commits the transaction and sends a "committed" message to the participants in P, the initiator i, the coordinator c, and the distributor d (for example, committed(P, i, c, d)). The participant p then transitions to the committed state C.

In the first prepared state Pcd, the participant p may also receive an "abort" message from the coordinator c or the distributor d (for example, abort(c, d)), or the "aborted" message from another participant p' (for example, aborted(p')). In response, the participant p aborts the transaction, sends the "aborted" message to the participants in P, the initiator i, the coordinator c, and the distributor d, (for example, aborted(P, i, c, d)), and transitions to the aborted state A.

3. The Second Prepared State Pc and the Third Prepared State Pd

As illustrated in FIG. 12D, in the second prepared state Pc, the participant p has pledged its vote to the coordinator c. In the third prepared state Pd, the participant p has pledged its vote to the distributor d. In the second prepared state Pc or the third prepared state Pd, the participant p may receive the "commit" message from the coordinator c or the distributor d (for example, commit(c, d)) or the "committed" message from another participant p' (for example, committed(p')). In response, the participant p commits the transaction, sends the "committed" message to the participants in P, the initiator i, the coordinator c, and the distributor d (for example, committed(P, i, c, d)) and transitions to the committed state C.

In the second prepared state Pc or the third prepared state Pd, the participant p may also receive the "abort" message from the coordinator c or the distributor d (for example, abort(c, d)) or the "aborted" message from another participant p' (for example, aborted(p')). In response, the participant p aborts the transaction, sends the "aborted message" to the participants in P, the initiator i, the coordinator c, and the distributor d (for example, aborted(P, i, c, d)) and transitions to the aborted state A.

In the second prepared state Pc, the participant p may detect a disconnect from the coordinator c (for example, disconnect(c)) or receive the "revoke" message from the coordinator c (for example, revoke(c)). In response, the participant p sends a "prepared" message to the participants in P (for example, prepared(P)) and transitions to the fourth prepared state Pp.

In the third prepared state Pd, the participant p may detect a disconnect from the distributor (for example, disconnect(d)) or receive the "revoke" message from the distributor (for example, revoke(d)). In response, the participant p sends the "prepared" message to the participants in P (for example, prepared(P)) and transitions to the fourth prepared state Pp.

4. The Fourth Prepared State Pp

As illustrated in FIG. 12D, the participant p transitions to the fourth prepared state Pp from the second prepared state Pc or the third prepared state Pd when it decides to resolve the transaction deterministically without further input from the coordinator c or the distributor d. As illustrated in FIG. 12C, in the fourth prepared state Pp, the participant p waits for all of the other participants in P to enter the fourth prepared state Pp (for example, S=P) before committing the transaction. After committing, the participant p sends the "committed" message to the participants in P, the initiator i, the coordinator c, and the distributor d (for example, committed(P, i, c, d)) and transitions to the committed state C.

When the participant p receives the "prepared" message from another participant p' (for example, prepared(p')), the participant p adds the other participant p' to the set of known participants S. When the participant p detects a connect from another participant p' (for example, connect(p')), it sends the "prepared" message to the other participant p' (for example, prepared(p')) in case the other participant p' did not receive the "prepared" message when it was disconnected.

In the fourth prepared state Pp, the participant p may receive the "aborted" message from another participant p' (for example, aborted(p')). In response, the participant p adds the other participant p' to a set of known aborted participants A' (for example, A'=A' u {p'} or A'={p'}) and sends the "aborted" message to the participants in P, the initiator i, the coordinator c, and the distributor d (for example, aborted(P, i, c, d)). The participant p then transitions to the aborted state A.

The participant p may also receive the "committed" message from another participant p' (for example, committed(p'))

while in the fourth prepared state Pp. In response, the participant p commits the transaction and adds the other participant p' to a set of known committed participants C' (for example, C'=C'∪{p'} or C'={p'}). The participant p then sends the "committed" message to the participants in P, the initiator i, the coordinator c, and the distributor d (for example, committed(P, i, c, d)) and transitions to the committed state C.

5. The Committed State C

The committed state C and the aborted state A are garbage collection states wherein the participant p handles information stored in a log during its execution of the commit protocol. As illustrated in FIG. 12C, the participant p waits until the other participants in P complete the transaction before clearing its log so that it can provide the information in the log to another participant p' that may not have received one or more messages sent, for example, when the other participant p' was disconnected.

In the committed state C, the participant p may receive the "committed" message from another participant p' (for example, committed(p')). In response, the participant p adds the other participant p' to the set of known committed participants C' (for example, C'=C'∪{p'}). Once all the participants in C' have committed (for example, C'=P), the participant p cleans its log and transitions to the final state F.

When the participant p detects a connection to another participant p' (for example, connect(p')), the participant p sends a "committed'" message to the other participant p' (for example, committed'(p')). Again, the participant p waits in the committed state C until C'=P.

6. The Aborted State A

As discussed above, the aborted state A is also a garbage collection state wherein the participant p handles information stored in a log during its execution of the commit protocol. As illustrated in FIG. 12C, in the aborted state A, the participant p may receive the "aborted" message from another participant p' (for example, aborted(p')). In response, the participant p adds the other participant p' to the set of known aborted participants A' (for example, A'=A'∪{p'}. Once all the participants in A' have aborted (for example, A'=P), the participant p cleans its log and transitions to the final state F.

When the participant p detects a connect to another participant p' (for example, connect(p')), the participant p sends an "aborted'" message to the other participant p' (for example, aborted'(p')). Again, the participant p waits in the aborted state A until A'=P.

7. The Final State F

The participant p ends the transaction in the final state F. As illustrated in FIG. 12C, in the final state F, the participant p may receive the "aborted'" message from another participant p' (for example, aborted'(p')). In response, the participant sends the "aborted" message to the other participant p' (for example, aborted(p')). The participant p may also receive the "committed'" message from another participant p' (for example, committed'(p')). In response, the participant p sends the "committed" message to the other participant p' (for example, committed(p')).

The following exemplary pseudocode illustrates one embodiment of the participant p:

```
function forget( ):
    clean log
    set state to F
function abort_count(A'):
    if A' ≠ P:           set state to (A, A')
    else:                forget( )
function commit_count(C'):
    if C' ≠ P:           set state to (C, C')
    else:                forget( )
function abort(A'):
    log(abort)
    send aborted to (P ∪ {i, c, d}) \ {p}
    abort_count(A')
function commit(C'):
    log(commit)
    send committed to (P ∪ {i, c, d}) \ {p}
    commit_count(C')
function pledge_c(S_tell, S_prepared):
    send pledged(c) to S_tell
    set state to (Pc, S_prepared)
function pledge_d(S_tell, S_prepared):
    send pledged(d) to S_tell
    set state to (Pd, S_prepared)
function prepare_p(S):
    send prepared to P \ {p}
    set state to (Pp, S)
in state (I, S):
    on disconnect from i, c, or d:    abort({p})
    on pledge from d:                 abort({p})
    on abort from i, c, or d:         abort({p})
    on aborted from p':               abort({p, p'})
    on prepared from p':              set state to (I, S ∪ {p'})
    on prepare from i:
        if error:                     abort({p})
        else:
                                      log(prepare)
                                      send prepared to c
                                      set state to (Pcd, S)
in state (Pc, S), (Pd, S), or (Pcd, S):
    on abort from c or d:             abort({p})
    on aborted from p':               abort({p, p'})
    on commit from c or d:            commit({p})
    on committed from p':             committed({p, p'})
in state (Pcd, S):
    on disconnect from d:             pledge_c({c}, S)
    on revoke from d:                 pledge_c({c}, S)
    on disconnect from c:             pledge_d({d}, S)
    on revoke from c:                 pledge_d({d}, S)
    on pledge from d:                 pledge_d({c, d}, S)
    on prepared from p':              set state to (Pcd, S ∪ {p'})
in state (Pc, S):
    on disconnect from c:             prepare_p(S ∪ {p})
    on revoke from c:                 prepare_p(S ∪ {p})
    on prepared from p':              set state to (Pc, S ∪ {p'})
in state (Pd, S):
    on disconnect from d:             prepare_p(S ∪ {p})
    on revoke from d:                 prepare_p(S ∪ {p})
    on prepared from p':              set state to (Pd, S ∪ {p'})
in state (Pp, S):
    on connect to p':                 send prepared to p'
    on aborted from p':               abort({p, p'})
    on committed from p':             commit({p, p'})
    on prepared from p':              set state to (Pp, S ∪ {p'})
    if S = P:                         commit({p})
in state (C, C'):
    on connect to p':                 send committed' to p'
    on committed from p':             commit_count(C' ∪ {p'})
    on committed' from p':            send committed to p'
                                      commit_count(C' ∪ {p'})
in state (A, A'):
    on connect to p':                 send aborted' to p'
    on aborted from p':               abort_count(A' ∪ {p'})
    on aborted' from p':              send aborted to p'
                                      abort_count(A' ∪ {p'})
in state F:
    on aborted' from p':              send aborted to p'
    on committed' from p':            send committed to p'
on start:                             set state to (I, ∅)
on restart:
    if last log was start:            abort({p})
    if last log was prepare:          set state to (Pp, {p})
    if last log was abort:            abort_count({p})
    if last log was commit:           commit_count({p})
```

The 2.5PC protocol is double-failure non-blocking if there are at least three participants and the coordinator c and the distributor d are on different nodes than each other and all participants. For example, if both the coordinator c and the distributor d fail after all the participants in P prepare, the participants will all go to the fourth prepared state Pp and resolve the transaction themselves. If, rather than crashing, the coordinator c and distributor d lose some of their network connections, including the connection between themselves, they may both realize that they can not get enough pledges to resolve the transaction and will send revoke messages to the participants in P. This will result in all the participants in P moving to the fourth prepared state Pp and resolving the transaction.

As another example, if the coordinator c and the participant p both fail, the distributor d will start gathering pledges. If there are at least three participants in P, there will be at least two non-failed participants p'. Thus, the distributor d will be able to get a majority of the votes. The distributor d will then abort the transaction. If the coordinator c and the failed participant p have not crashed, but just on the other side of a network split for example, the coordinator c will fail to gather enough pledges to commit the transaction and will transition to its final state F. The participant p will receive the result when it reconnects to one of the other participants p'.

As another example, a failure of both the distributor d and the participant p will cause all the other participants in P to disconnect from the distributor d. This will result in a majority of pledges to the coordinator c. The coordinator c will then commit the transaction. If the distributor d and the participant p are on the other side of a network split for example, they may or may not commit the transaction. If the distributor d received the original "commit" message from the coordinator c before the link went down, it will commit. However, if the distributor d did not receive the commit, the distributor d will start getting pledges. Once it discovers that it can only get one pledge, it will revoke and transition to its final state F. The participant p will resolve the transaction when it reconnects to another participant p'.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

What is claimed is:

1. A distributed system configured to process atomic transactions within the distributed system, the distributed system comprising:
   a plurality of participants in an atomic transaction, each of the plurality of participants residing on a node of a computer system;
   a coordinator residing on a first node of the computer system; and
   a distributor residing on a second node of the computer system;
   wherein the coordinator is configured to:
      receive votes directly from the plurality of participants;
      determine whether a majority of votes have been received from the plurality of participants;
      communicate a decision related to the atomic transaction to each of the plurality of participants, the decision based on whether a majority of votes have been received;
   wherein the distributor is configured to:
      receive votes directly from the plurality of participants;
      determine whether a majority of votes have been received from the plurality of participants;
      communicate a decision related to the atomic transaction to each of the plurality of participants, the decision based on whether a majority of votes have been received; and
   wherein each of the plurality of participants is configured to:
      receive a request related to the atomic transaction;
      send a vote to a recipient, the recipient comprising one of the coordinator and the distributor;
      receive either the decision related to the atomic transaction from the coordinator or the decision related to the atomic transaction from the distributor; and
      commit or abort the request based on the received decision; and
   wherein each of the votes comprises an indication that its sender will accept a decision of a recipient of whether to commit or abort the atomic transaction, the recipient comprising one of the coordinator and the distributor, wherein at least one of the plurality of participants sends to the distributor an indication that the at least one of the plurality of participants will accept a decision of the coordinator of whether to commit or abort the atomic transaction.

2. The distributed system of claim 1, wherein each of the plurality of participants, the coordinator, and the distributor are located on separate nodes to provide double-failure tolerance.

3. The distributed system of claim 1, wherein the coordinator or distributor is located on the same node as one of the plurality of participants to provide single-failure tolerance.

4. The distributed system of claim 1, wherein the recipient is the coordinator if the participant has lost communication with the distributor, the recipient is the distributor if the participant has lost communication with the coordinator, and if a vote is requested by the coordinator or the distributor, the recipient is the one of the coordinator and the distributor which requested the vote.

5. The distributed system of claim 1, wherein the coordinator is further configured to communicate a decision to commit the atomic transaction if the majority of votes is for the coordinator, and wherein the distributor is further configured to communicate a decision to abort the atomic transaction if the majority of votes is for the distributor.

6. The distributed system of claim 1, wherein each of the plurality of participants is further configured to:
   receive a message related to the atomic transaction from each of the other plurality of participants; and
   if communication is lost with both the coordinator and the distributor, commit or abort the atomic transaction based on the messages received from the other plurality of participants.

7. The distributed system of claim 6, wherein each of the plurality of participants is further configured to:
   if communication is lost with both the coordinator and the distributor, abort the transaction if an abort message is received from one of the other plurality of participants; and
   if communication is lost with both the coordinator and the distributor, commit the transaction if a commit message is received from each of the other plurality of participants.

8. A method of resolving an atomic transaction comprising multiple transactions among a plurality of nodes within a distributed computing system, the method comprising:

receiving, by each of a plurality of participant nodes, a transaction request related to the atomic transaction, each of the plurality of participant nodes comprising a processor and memory;

determining, by each of a first subset of the plurality of participant nodes, that communication with a coordinator node is not available, the coordinator node comprising a processor and memory;

in response to the determination by each of the first subset of participant nodes that communication with the coordinator node is not available, sending, by each of the first subset of the plurality of participant nodes, a vote for a distributor node directly to the distributor node, the vote comprising an indication that the participant node will accept a decision of the distributor node of whether to commit or abort the atomic transaction, the distributor node comprising a processor and memory, wherein both the distributor node and the coordinator node are configured to receive votes from the plurality of participant nodes;

sending, by the distributor node, a pledge message to each of the plurality of participants nodes from which a vote has not yet been received;

receiving, by each of at least a second subset of the plurality of participant nodes, the pledge message, wherein the first subset and the second subset of the plurality of participant nodes collectively comprise a majority of the plurality of participant nodes, wherein each participant node receiving the pledge message is configured to send to the distributor node, in response to the pledge message, a vote indicating one of the distributor node or the coordinator node from which the participant node will accept a decision regarding the transaction, wherein at least one participant node sends to the distributor node an indication that the at least one participant node will accept a decision of the coordinator node of whether to commit or abort the atomic transaction;

sending, by each of the second subset of the plurality of participant nodes, a vote for the distributor node directly to the distributor node, wherein each vote for the distributor node indicates that the participant node will accept a decision of the distributor node of whether to commit or abort the atomic transaction;

determining, by the distributor node, that a majority of the plurality of participant nodes have voted for the distributor node, the majority comprising at least the first subset and the second subset of the plurality of participant nodes;

sending, by the distributor node, a decision related to the atomic transaction to the plurality of participant nodes; and resolving the request in accordance with the decision.

9. The method of claim 8, wherein said decision is to abort said atomic transaction.

10. A method of resolving a transaction in a distributed computing system, the method comprising:

receiving, by each of a plurality of participant nodes, a request related to an atomic transaction, each of the plurality of participant nodes comprising a processor and memory;

sending, by each of the plurality of participant nodes, a prepared message directly to a coordinator node, the coordinator node comprising a processor and memory;

sending, by the coordinator node, a commit message to a distributor node, the distributor node comprising a processor and memory;

determining, by each of a first subset of the plurality of participant nodes, that communication with the distributor node is not available;

in response to the determination that communication with the distributor node is not available, sending, by each of the first subset of the plurality of participant nodes, a vote for the coordinator node directly to the coordinator node, the vote comprising an indication that the participant node will accept a decision of the coordinator node of whether to commit or abort the atomic transaction, wherein both the distributor node and the coordinator node are configured to receive votes from the plurality of participant nodes;

sending, by each of a second subset of the plurality of participant nodes, a vote for the distributor node directly to the distributor node, the vote comprising an indication that the participant node will accept a decision of the distributor node of whether to commit or abort the atomic transaction, wherein at least one of the second subset of the plurality of participant nodes sends to the coordinator node an indication that the at least one of the second subset of the plurality of participant nodes will accept a decision of the distributor node of whether to commit or abort the atomic transaction;

determining, by the coordinator node, that a majority of the plurality of participant nodes have voted for the coordinator node, the majority comprising at least the first subset of the plurality of participant nodes; and sending, by the coordinator node, a decision related to the atomic transaction to the plurality of participant nodes; and resolving the request in accordance with the decision.

11. The method of claim 10, further comprising:

determining, by the distributor node, that communication with a third subset of the plurality of participant nodes is not available;

determining, by the distributor node, that a majority of the plurality of participant nodes have voted for the coordinator node, the majority comprising at least the third subset of the plurality of participant nodes; and sending, by the distributor node, a revoke message to at least the second subset of participant nodes from which the distributor node has received a vote.

12. The method of claim 10, wherein said decision is to commit said atomic transaction.

13. The distributed system of claim 1, wherein the first node and the second node are the same.

14. The distributed system of claim 1, wherein the first node and the second node are different.

* * * * *